United States Patent [19]

Matsumoto et al.

[11] Patent Number: 5,617,383
[45] Date of Patent: Apr. 1, 1997

[54] OPTICAL DISK DEVICE CAPABLE OF DISPLAYING THE WHOLE CAPACITY AND THE REPRODUCTION POSITION ON THE OPTICAL DISK

[75] Inventors: Kissei Matsumoto; Katsuki Fuchu, both of Kanagawa; Shinji Katsuki, Tokyo, all of Japan

[73] Assignee: Sony Corporation, Tokyo, Japan

[21] Appl. No.: 450,574

[22] Filed: May 25, 1995

[30] Foreign Application Priority Data

May 30, 1994 [JP] Japan ..................... 6-137808

[51] Int. Cl.$^6$ .............................. G11B 17/22; G11B 3/70
[52] U.S. Cl. ................... 369/32; 369/56; 369/54
[58] Field of Search .................. 369/32, 48, 47, 369/54, 58, 33, 55, 56, 57

[56] References Cited

U.S. PATENT DOCUMENTS

| | | | |
|---|---|---|---|
| 4,858,031 | 8/1989 | Fukuta | 358/342 |
| 4,991,159 | 2/1991 | Tomoda et al. | 369/32 |
| 5,138,600 | 8/1992 | Aoyagi | 369/32 |
| 5,392,265 | 2/1995 | Takezawa | 369/32 |
| 5,485,442 | 1/1996 | Furukawa et al. | 369/47 |

FOREIGN PATENT DOCUMENTS

| | | |
|---|---|---|
| 0275972A1 | 7/1988 | European Pat. Off. . |
| 0399853A2 | 11/1990 | European Pat. Off. . |
| 0406021A2 | 1/1991 | European Pat. Off. . |
| 0571191A2 | 11/1993 | European Pat. Off. . |
| 0595358A2 | 5/1994 | European Pat. Off. . |
| 4025454A1 | 3/1991 | Germany . |

OTHER PUBLICATIONS

Patent Abstracts of Japan, vol. 18, No. 159 (P-1711), 16 Mar. 1994 & JP-A-05 325509 (Sony Corporation), 10 Dec. 1993.

Patent Abstracts of Japan, vol. 8, No. 79 (P-267), 11 Apr. 1984 & JP-A-58 222478 (Matsushita Denki Sangyo K.K.) 24 Dec. 1983.

*Primary Examiner*—Tan Dinh
*Attorney, Agent, or Firm*—Limbach & Limbach L.L.P.

[57] ABSTRACT

A recording and/or reproducing apparatus for a recording medium such as an optical disc includes a head, a recording and/or reproduction control unit, an arithmetic operating unit and a display control unit. On the recording medium, management data for controlling recording of data recorded on a data recording area or the operation of recording and/or reproducing recorded data, and address data have been recorded. The head performs recording of data on the recording medium or reading out of recorded data therefrom. The recording and/or reproduction control unit records data on the recording medium discretely by the head, and reads out data discretely recorded on the recording medium as continuous data on the basis of the management data. The arithmetic operating unit arithmetically computes data representative of a reproduction position of data recorded in the data recording area of the recording medium. The display control unit allows the display unit to display the entire recording capacity of the recording area of the recording medium on the basis of the management data read out by the head, and allows the display means to display the reproduction position on the basis of data representative of a position calculated by the arithmetic operating unit.

12 Claims, 16 Drawing Sheets

FIG. 5

| | 16 bit | | 16 bit | | |
|---|---|---|---|---|---|
| | MSB      LSB | MSB      LSB | MSB      LSB | MSB      LSB | |
| header { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | "M" | "I" | "N" | "I" | 6 |
| | Disk type | Rec power | First TNO | Last TNO | 7 |
| | read-out start address (RO$_A$) | | | Used Sectors | 8 |
| | power cal area start address PC$_A$) | | | 00000000 | 9 |
| | U-TOC start address (UST$_A$) | | | 00000000 | 10 |
| | recordable user area start address (RST$_A$) | | | 00000000 | 11 |
| corresponding table indicating data section { | 00000000 | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| management table section (255 part table) { (01h) | start address | | | truck mode | 78 |
| | end address | | | 00000000 | 79 |
| (02h) | start address | | | truck mode | 80 |
| | end address | | | 00000000 | 81 |
| (03h) | start address | | | truck mode | 82 |
| | end address | | | 00000000 | 83 |
| (FCh) | start address | | | truck mode | 580 |
| | end address | | | 00000000 | 581 |
| (FDh) | start address | | | truck mode | 582 |
| | end address | | | 00000000 | 583 |
| (FEh) | start address | | | truck mode | 584 |
| | end address | | | 00000000 | 585 |
| (FFh) | start address | | | truck mode | 586 |
| | end address | | | 00000000 | 587 |

P-TOC sector-0

FIG.6

| | 16 bit | | 16 bit | | |
|---|---|---|---|---|---|
| | MSB        LSB | MSB        LSB | MSB        LSB | MSB        LSB | |
| header { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| correspon- { | Disk | ID | P-DFATY | P-EMPTY | 11 |
| dance table | P-FRA | P-TN01 | P-TN02 | P-TN03 | 12 |
| information | P-TN04 | P-TN05 | P-TN06 | P-TN07 | 13 |
| data section | | | | | |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| (01h) | start address | | | track mode | 78 |
| | end address | | | link information | 79 |
| (02h) | start address | | | track mode | 80 |
| | end address | | | link information | 81 |
| (03h) | start address | | | track mode | 82 |
| manage- | end address | | | link information | 83 |
| ment table section (255 parts table) | | | | | |
| (FCh) | start address | | | track mode | 580 |
| | end address | | | link information | 581 |
| (FDh) | start address | | | track mode | 582 |
| | end address | | | link information | 583 |
| (FEh) | start address | | | track mode | 584 |
| | end address | | | link information | 585 |
| (FFh) | start address | | | track mode | 586 |
| | end address | | | link information | 587 |

U-TOC sector-0

FIG. 7

P-FRA = | 03h |

| | start address | end address | link information |
|---|---|---|---|
| (03h) | $S_{03}$ | $E_{03}$ | 18h |
| (18h) | $S_{18}$ | $E_{18}$ | 1Fh |
| (1Fh) | $S_{1F}$ | $E_{1F}$ | 2Bh |
| (2Bh) | $S_{2B}$ | $E_{2B}$ | E3h |
| (E3h) | $S_{E3}$ | $E_{E3}$ | 00h | record start on record

STOP/TOC EDIT

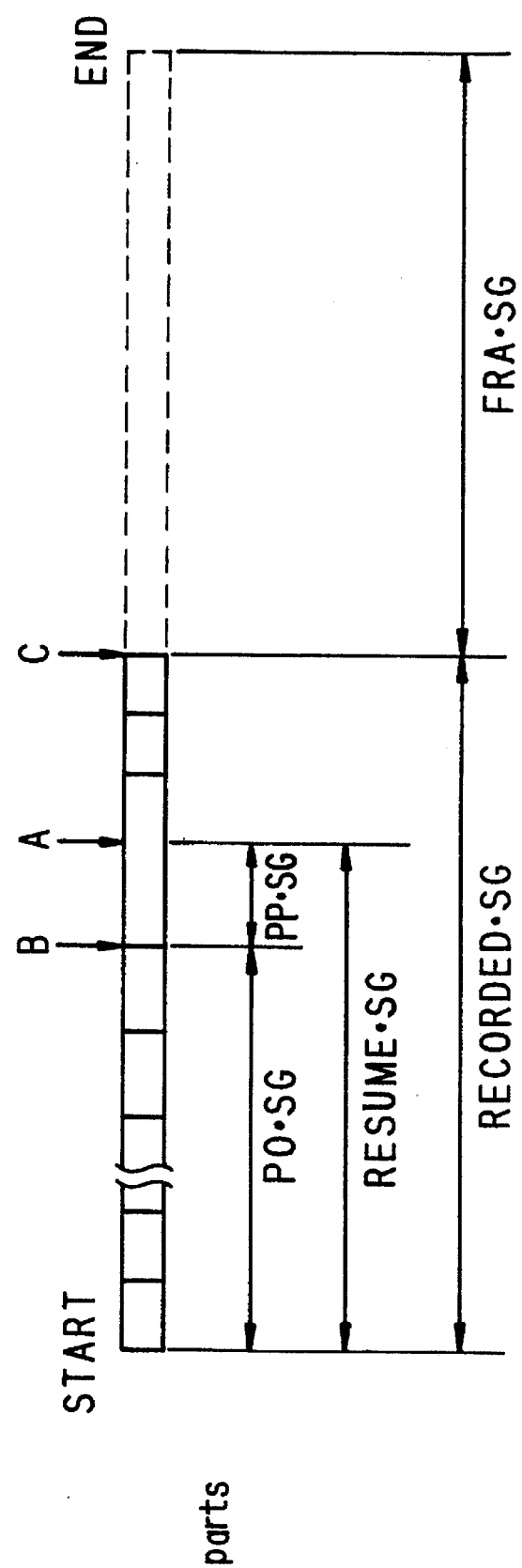

TOC read

TOC read completion replay, replay pause, AMC, CUE/REV

STOP

OPTICAL DISK DEVICE CAPABLE OF DISPLAYING THE WHOLE CAPACITY AND THE REPRODUCTION POSITION ON THE OPTICAL DISK

BACKGROUND

1. Field of the Invention

The present invention relates to a recording and/or reproducing apparatus for a recording medium. More particularly, the present invention relates to a recording and/or reproducing apparatus for a recording medium, with a display unit.

2. Background of the Invention

For example, as reproducing apparatus capable of reproducing a tune, a voice or the like, there have been known reproducing apparatus for an optical disc and a magneto-optical disc, for example, a compact disc (CD), on which an audio signal is recorded as a digital signal.

In the recent years, there have been known disc recording and/or reproducing apparatus by which a user can record tune data or the like on a magneto-optical disc which is used as a recording medium. This disc recording and/or reproducing apparatus are provided with an area where data of audio data, a tune or the like has already been recorded and a data area (a user table of contents, hereinafter referred to as "U-TOC") where data for managing unrecorded area is provided. For example, the management data is rewritten in accordance with operation of recording, editing, erasing or the like.

For example, in recording a certain audio data, the recording and/or reproducing apparatus searches the unrecorded area on a disc from the U-TOC, and records audio data which has been inputted to the apparatus on that unrecorded area. In reproducing audio data, the recording and/or reproducing apparatus discriminates an area on which audio data (track) to be reproduced has been recorded from the U-TOC and accesses to that area before executing a reproduction operation.

The recordable disc media such as a magneto-optical disc allow random access to be extremely facilitated in comparison with tape-shaped recording media such as a DAT (Digital Audio tape) or a compact cassette tape. This makes it unnecessary to record from the inner peripheral side toward the outer peripheral side on the disc, that is, from a first track to an n-th track in the correct order. In other words, even though respective tunes have been recorded at the physically dispersed positions on the disc, a tune can be reproduced in the correct order as far as the addresses at the first track to the n-th track where the respective tunes have been recorded are managed.

Furthermore, the foregoing recordable disc media make it unnecessary to always record, for example, one track (audio data) on continuous parts (here, the parts mean parts where physically continuous data have been recorded), and not suffer from any problems even though audio data has been recorded discretely on a plurality of separated parts on the disc discretely.

In particular, in a recording and/or reproducing apparatus where data read out from a magneto-optical disc is stored in a buffer memory at a high rate once, and the data is then read out from the buffer memory at a low rate before the data is subjected to a demodulating process into an audio reproduction signal, even though reading data from the magneto-optical disc is interrupted temporarily due to access between the parts, the reproduced signal can be outputted without being interrupted.

Accordingly, if the recording and/or reproducing operation within the parts and the high-rate access operation (the access operation which terminates within a reproducible period of time due to a data storage quantity-produced by a difference between a writing rate and a reading rate of the buffer memory) are repeated, even though a track for one tune is separated into a plurality of parts so as to be physically divided, the recording and/or reproducing operation for the tune does not suffer from any problems.

For example, as shown in FIG. 1, a plurality of tunes have been physically continuously recorded on one part in such a manner that a first tune has been recorded on a part $M_1$ and a second tune has been recorded on a part $M_2$. Also, each tune can be recorded on the disc so as to be divided into a plurality of parts as shown by parts $M_{4(1)}$ to $M_{4(4)}$ and $M_{5(1)}$ to $M_{5(2)}$ provided for a fourth tune and a fifth tune, respectively. FIG. 1 simply shows a schematic example, and actually there are many cases where one part is organized by several to several hundred tracks or more.

When the operation of recording or erasing a tune with respect to a magneto-optical disc is repeated, a difference in a performance time of the recording tune or in a performance time of the erased tune causes an empty area on a track to be produced irregularly. However, the execution of such a discrete recording operation enables a tune longer than the erased tune to be recorded by utilizing its erased portion. With the repeated recording/erasing operation, the occurrence of a useless data recording area is avoided. What is recorded is not necessarily limited to "tune", but includes anything if it is of an audio signal. However, in this specification, a description will be given assuming that a tune is recorded as data (track) of one unit having continuous contents.

In the magneto-optical disc, during the recording operation, the recording operation must be continued while accessing to a plurality of parts constituting unrecorded areas. During the reproducing operation, the parts must be accessed in such a manner that one tune is continuously recorded correctly. Data necessary for joining parts (for example, $M_{4(1)}$ to $M_{4(4)}$) together within one tune and data representative of an unrecorded area, which are required to satisfy the foregoing conditions, are recorded on the magneto-optical disc as the U-TOC information which can be rewritten every recording operation or erasing operation as described above. The recording and/or reproducing apparatus is controlled so as to perform the recording/reproducing operation appropriately by reading the U-TOC information to conduct the accessing operation of a head.

The recording data on the magnetic disc is organized by cluster unit CL (=36 sectors) unit consisting of a sub data area of 4 sectors (1 sector=2352 bytes) and a main data area of 32 sectors, and one cluster is set as a minimum unit during the recording operation. One cluster corresponds to 2 to 3 tracks. An address is recorded every sector.

The sub data area of 4 sectors is used as sub data, a linking area or the like. The TOC data, audio data or the like is recorded on the main data area of 32 sectors.

The sector is further sub-divided into a plurality of sound groups in such a manner that two sectors are divided into 11 sound groups. Within the sound group, data of 512 samples is separated into an L-channel and a R-channel and then recorded. One sound group has the quantity of audio data corresponding to a period of time of 11.6 msec.

In the foregoing reproduction of a tune or the like through a disc-shaped recording medium such as the magneto-optical disc, a current reproduction position is displayed in the time-axial manner on a display unit of the reproducing apparatus. For example, as this display technique, there has been known that a track number of a track which is now being reproduced and a reproduction elapsed time for this track are displayed by minutes/seconds. Also, there has been known that this display mode is changed over to display a reproduction remaining period of time for a track which is being reproduced. Moreover, the display mode is changed over to display a reproduction elapsed period of time, a reproduction, remaining period of time or the like relative to a total recording period of time of the magneto-optical disc.

Further, in the case of recording a tune as audio data or the like on the disc-shaped recording medium, there has been known a display system such that, in the recording standby state or the like, the number of recording tracks, for example, a recorded period of time, a recordable remaining period of time and the like are calculated frown the U-TOC information and then displayed, and during the recording operation, a track number of a track which is now being recorded, a recording position on that track, and the like are displayed by minutes/seconds.

However, the foregoing display system suffers from a problem, for example, that, because an elapsed period of time for a certain track is displayed only by a numerical display, this makes it difficult for a user to instantaneously grasp where is factually a reproduction position or a recording position on the whole magneto-optical disc as a disc-shaped recording medium.

In particular, in the foregoing recording and/or reproducing apparatus using the buffer memory, there has been known a recording system in which an unrecorded area (free area) on which a tune has not been recorded as data is automatically searched to execute recording, as well as a so-called over-write recording system in which past data is erased from a portion at which the recording operation starts, that is, a past tune is erased in the same manner as that in using the compact cassette tape, and a new tune is recorded thereon. However, in the case of recording on the magneto-optical disc through the over-write recording system, if the user relies on the foregoing position displaying by only the numerical display, he cannot instantaneously grasp where is a position at which recording is to start on the whole magneto-optical disc, and is liable to feel uneasy whether the current recording start position actually coincides with a position that the user desires or not.

Further, one type of the foregoing recording and/or reproducing apparatus using the buffer memory is provided with a resume function. The resume function is so designed that even though a reproducing operation is stopped or a power supply is turned off by operating a stop key or a power key, a final reproduction stop position is stored and held as a resume point so far as the magneto-optical disc remains loaded without being ejected. Thereafter, for example, in the case where the power supply is again turned on to conduct reproduction or recording (in this case, the foregoingover-write system), the resume point can be set to a recording/reproducing start position. In this case, similarly, a position on the whole magneto-optical disc to be reproduced or recorded is difficult to instantaneously grasp particularly due to the position displaying by only numerical display.

SUMMARY OF THE INVENTION

It is therefore an object of the present invention to provide a recording and/or reproducing apparatus for a recording medium, which resolves the above-mentioned problem.

According to the present invention, there is provided a recording and/or reproducing apparatus for a recording medium on which management data for controlling recording of data recorded on a data recording area, or the operation of recording and/or reproducing recorded data are controlled is recorded the apparatus includes a head, an arithmetic operating unit, a display unit and a display control unit. The head performs recording of data on the recording medium or reading of recorded data. The arithmetic operating unit arithmetically computes data representative of a reproduction position of data recorded in a data recording area of the recording medium by using the management data read out from the recording medium through the head. The display control unit performs a display representative of the whole recording capacity of the recording area of the recording medium on the display unit on the basis of the management data read by the head. The display control unit also performs a position display on the display unit on the basis of data representative of a position obtained by the arithmetic operation of the arithmetic operating unit.

According to the present invention, there is provided a recording and/or reproducing apparatus for a recording medium on which management data for controlling recording of data recorded on a data recording area, or the operation of recording and/or reproducing recorded data are controlled as well as address data is recorded. The apparatus includes a head, a recording and/or reproduction control unit, an arithmetic operating unit, a display unit and a display control unit. The head performs recording of data on the recording medium or reading of recorded data. The recording and/or reproduction control unit discretely records data on the recording medium through the head and reads data, which has been discretely recorded on the recording medium, as continuous data on the basis of the management data. The arithmetic operating unit arithmetically computes data representative of a reproduction position of data recorded in a data recording area of the recording medium by using the management data read out from the recording medium through the head. The display control unit performs display representative of the whole recording capacity of the recording area of the recording medium on the display unit on the basis of the management data read out by the head. The display control unit also performs position display on the display unit on the basis of data representative of a position obtained by the arithmetic operation of the arithmetic operating unit.

According to the present invention, the user can readily visually confirm at which position dataread out from the recording medium loaded into the apparatus is in the data recording area of the recording medium, or at which position that data is relatively with respect to a head position of the data recording area through a position display on the display unit. In recording data on the recording medium loaded into the apparatus, the user can readily visually confirm at which position data read out from the recording medium loaded into the apparatus is in the data recording area of the recording medium, or at which position that data is relatively with respect to a head position of the data recording area through a position display on the display unit. Also, the user can readily visually confirm any of the foregoing display by his eyes by displaying the whole recording capacity of the recording medium on the display unit.

The above and further objects, features and advantages of the invention will appear more fully from the accompanying drawings and the following detailed description.

BRIEF DESCRIPTION OF THE DRAWINGS

FIG. 5 is an explanatory diagram showing a P-TOC sector in a disc;

FIG. 6 is an explanatory diagram showing a U-TOC sector in a disc;

FIG. 7 is an explanatory diagram showing the structure of a link of the U-TOC sector in a disc;

FIG. 10 is an explanatory diagram showing the procedure of calculating the present position and a recording capacity in accordance with the embodiment of the invention;

DESCRIPTION OF THE INVENTION

Figure 1:
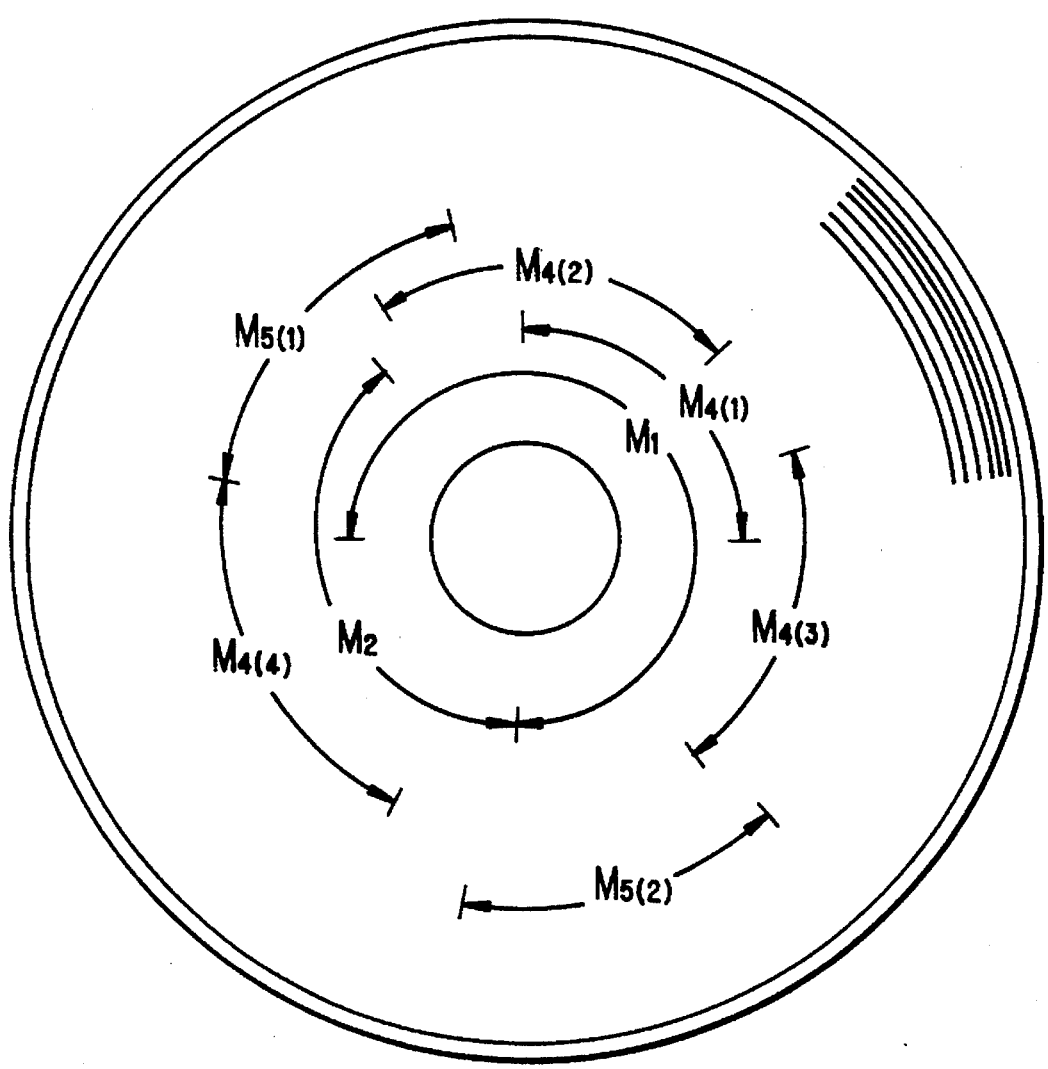
FIG. 1 is an explanatory diagram showing a recording format of a disc.
Figure 2:
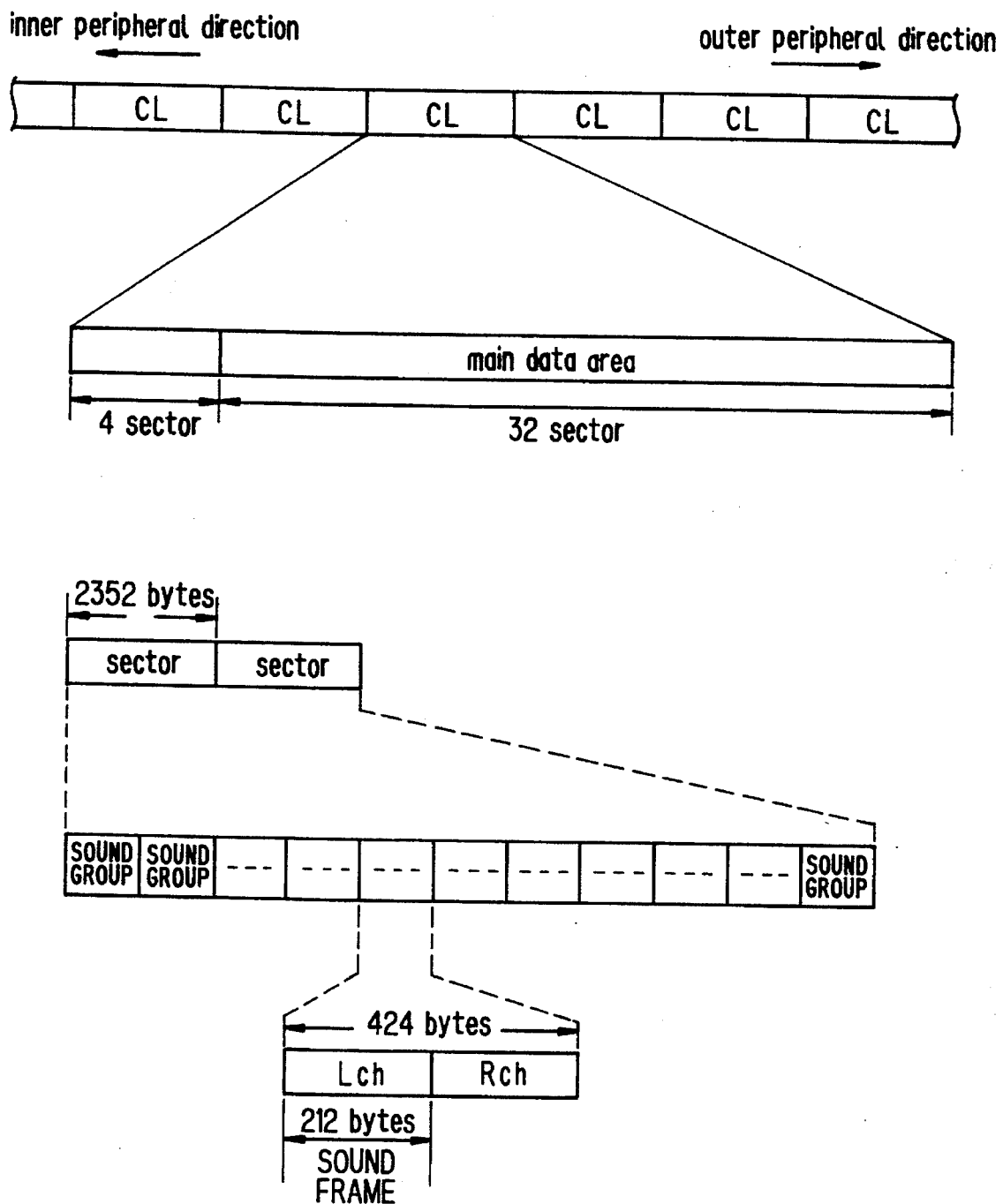
FIG. 2 is an explanatory diagram showing the structure of a sector of the disc.

Hereinafter, a description will be given in detail of a recording and/or reproducing apparatus for a recording medium in accordance with an embodiment of the present invention with reference to FIGS. 3 to 16. In the embodiments described below, a recording and/or reproducing apparatus using a magneto-optical disc as recording medium are described in the following order.

1. The structure of a recording and/or reproducing apparatus

2. A P-TOC sector

3. A U-TOC sector

4. An example of the display operation of a position pointer

5. The processing operation for displaying a position pointer

6. A variety of modified examples of the display operation of a position pointer (1. The structure of a recording and/or reproducing apparatus)

Figure 3:
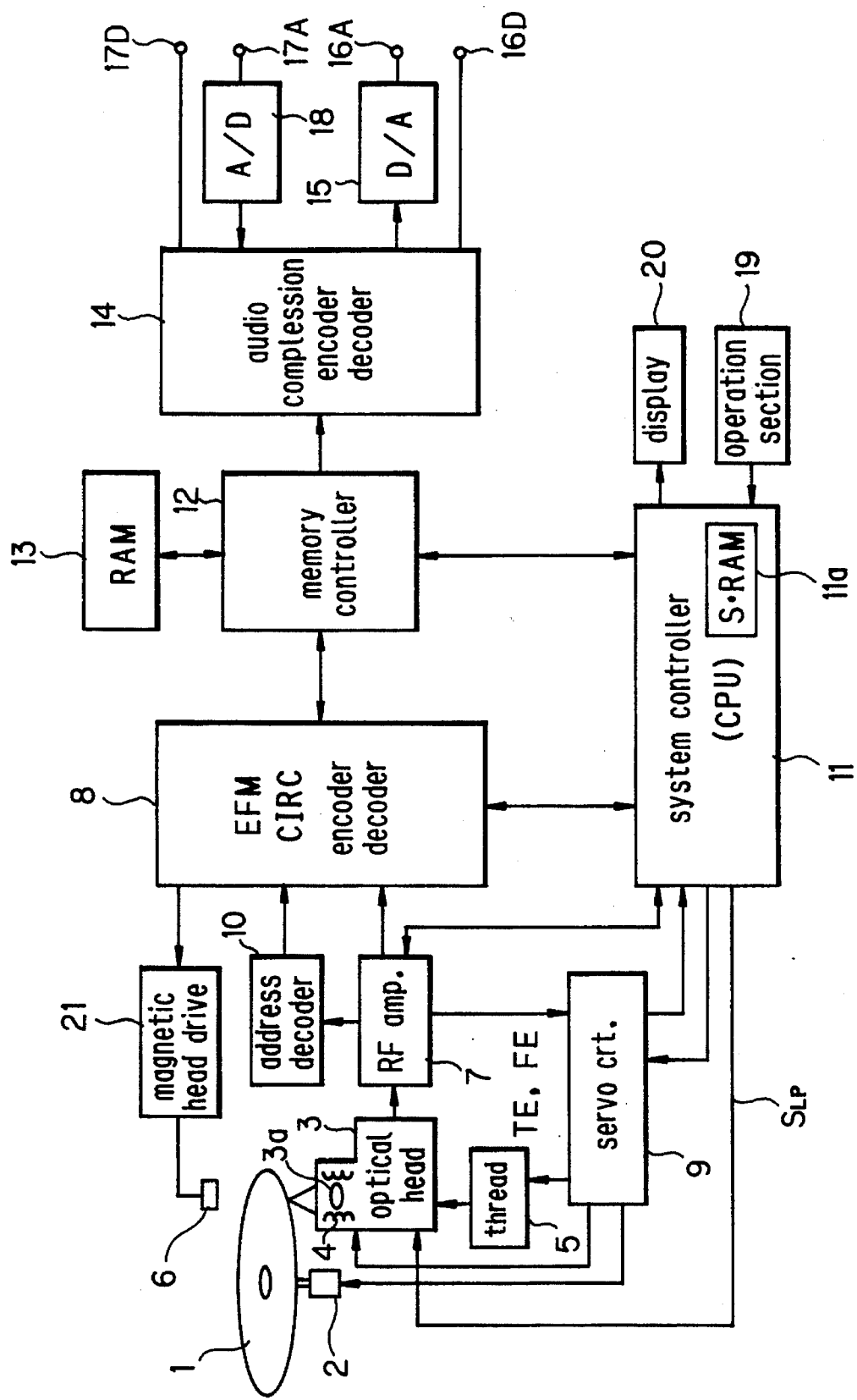
FIG. 3 is a block diagram showing a main portion of a recording and/or reproducing apparatus in accordance with an embodiment of the present invention.

FIG. 3 is a block diagram showing a main portion of a recording and/or reproducing apparatus in accordance with an embodiment of the present invention.

In FIG. 3, reference numeral 1 denotes a magneto-optical disc on which audio data has been recorded or will be recorded. The magneto-optical disc 1 is rotatably driven by a spindle motor 2. A reference numeral 3 denotes an optical head for irradiating a laser beam onto a magneto-optical disc 1 during the recording/reproducing operation. The optical head 3 radiates a light beam having a high level for heating recording tracks to the Curie temperature during the recording operation, but radiates a light beam having a relatively low level for detecting data from a reflected light beam by the magnetic Kerr effect during the reproducing operation.

For that reason, a laser diode as a light source, an optical system having of a polarizing beam splitter, an objective lens 3a and so on, and a photodetector for receiving and detecting a reflected light beam are mounted on the optical head 3. The objective lens 3a is held so that it can be displaced by an actuator 4 in a radial direction of a disc, that is, in a tracking direction, and in a direction along which the objective lens 3a is brought in or out of contact with the disc, that is, in a focussing direction.

A reference numeral 6 denotes a magnetic head for applying a vertical magnetic field modulated by supplied data to a magneto-optical disc. The magnetic head 6 is arranged so as to be opposed to the optical head 3 through the magneto-optical disc 1. The optical head 3 and the magnetic head 6 are moved by a thread mechanism in the radial direction of the disc.

During the reproducing operation, a photodetector of the optical head 3 receives a light beam reflected by the magneto-optical disc 1 and supplies an output signal to an RF amplifier 7. The RF amplifier 7 processes the output signal supplied from the photodetector to produce and extract an RF signal, tracking error signal, a focus error signal, an absolute position information (an absolute position information recorded as a pre-group (wobbling group) on the magneto-optical disc 1), an address information, a focus monitor signal and the like. The produced RF signal is supplied to an encoder/decoder 8. The tracking error signal and the focus error signal are supplied to a servo circuit 9, and the address information is supplied to an address decoder 10. Furthermore, the absolute position information and the focus monitor signal are supplied to a system controller 11 which is constituted by, for example, a microcomputer.

The servo circuit 9 produces a variety of servo drive signals in accordance with a tracking error signal, a focus error signal, as well as a track jump command, a seek command and a rotary speed detection information of the spindle motor 2 from the system controller 11, and so on. The various servo drive signals thus produced are supplied to the thread mechanism 5 to perform focus control as well as tracking control. Also, the spindle motor 2 is rotatably driven at a constant angular velocity (CAV) or a constant linear velocity (CLV).

After being subjected to an EFM modulation and a decoding processing such as a CIRC by the encoder/decoder 8, the RF signal is written into the buffer memory 13 by the memory controller 12 once. Reading out data from the magneto-optical disc 1 by the optical head 3 and transferring reproduced data in a system from the optical head 3 to the Duffer memory 13 are conducted at a rate of 1.41 Mbit/sec intermittently.

The data written into the buffer memory 13 is read at a timing such that reproduced data is transferred at 0.3 Mbit/sec, and supplied to an encoder/decoder 14. The data read out from the buffer memory 13 is subjected to a reproduced signal processing such as a decoding processing for an audio compression processing by the encoder/decoder 14, thereby being converted into a digital signal.

The digital signal outputted from the encoder/decoder 14 is converted into an analog signal by a D/A converter 15 and then supplied to an analog line output terminal 16A, or the digital signal outputted from the encoder/decoder 14 is supplied directly to a digital output terminal 16D without being converted into an analog signal.

In this example, writing/reading of data with respect to the buffer memory 13 is conducted by designating an address under the control of a write pointer and a read pointer. The write pointer (write address) is increased at a timing of 1.41 Mbit/sec as described above whereas the read pointer (read pointer) is increased at a timing of 0.3 Mbit/sec. As a result, a difference between a read-out bit rate and a write bit rate causes data of a certain quantity to be stored within the buffer memory 13. When data is stored within the buffer memory 13 so as to be filled to its storage capacity, the increment of the write pointer is stopped, and the operation of reading data from the magneto-optical disc 1 by the optical head 3 is also stopped. Since the increment of the read pointer R is continuously executed, the analog signal or digital signal to be outputted from the output terminal 16A or the output terminal 16D is outputted without being interrupted.

Thereafter, only the reading operation from the buffer memory 13 is continued, and if a data storage quantity within the buffer memory 13 becomes equal to a predetermined quantity or less at a certain time, the data reading operation and the increment of the write pointer due to the optical head 3 are restarted so that data is again stored in the buffer memory 13.

In this way, a reproduced acoustic signal is outputted through the buffer memory 13. This prevents the interruption of the reproduced audio output even if the tracking servo is out of order by, for example, disturbance. While data remains within the buffer memory 13, reading of data is restarted by, for example, gaining access to a correct tracking position, that is, a position at which the tracking servo is out of order. This enables the reproducing operation to be continued without any interruption of the reproduced audio output. In other words, a vibration-resistant performance can be remarkably improved.

In FIG. 3, the address information outputted from the address decoder 10 and sub-code data accompanied by the control operation are supplied to the system controller 11 through the encoder/decoder 8 and then used for a variety of control operations.

Furthermore, a lock detection signal from a PLL circuit which produces a bit clock signal for the recording/reproducing operation as well as a monitor signal representative of a state in which a frame synchronizing signal lacks in reproduced data (L- and R- channels) is also supplied to the system controller 11.

The system controller 11 outputs a control signal SLP which controls the operation of the laser diode in the optical head 3, and controls the on/off operation of the output of the laser diode. The on-control of the laser diode can be changed over between an output of the light beam at the time of reproduction where the output level of the light beam irradiated from the laser diode is relatively low and an output of the light beam at the time of recording where the output level of the light beam is relatively high.

In the execution of the recording operation with respect to the magneto-optical disc 1, an analog or digital audio signal is supplied from other equipment to the apparatus through an audio cord connected to an analog input terminal 17A, an audio optical cable connected to a digital input terminal 17D or the like.

In the case where the digital signal is inputted to the digital input terminal 17D, the digital signal is supplied directly to the encoder/decoder 14. The analog audio signal inputted from the analog input terminal 17A, after being converted into a digital signal by an A/D converter 18, is supplied to the encoder/decoder 14.

In the encoder/decoder 14, the inputted digital signal is subjected to an audio compression encoding process. The record data which has been compressed by the encoder/decoder 14 is written into the buffer memory 13 by the memory controller 12 once. The digital data stored in the buffer memory 13 is read out at a predetermined timing and then supplied to the encoder/decoder 8. After being subjected to an encoding process such as CIRC encoding, EFM modulation or the like, the digital data is supplied to a magnetic head drive circuit 21.

The magnetic head drive circuit 21 supplies a magnetic head drive signal to the magnetic head 6 on the basis of the record data which has been encoded. In other words, An N-pole or S-pole vertical magnetic field is supplied to the magneto-optical disc 1 by the magnetic head 6. In this situation, the system controller 11 supplies the control signal SLR to the optical head 3 so that the optical head 3 radiates a light beam of a recording level.

A reference numeral 19 denotes an operation input section having keys manipulated by a user. The keys are composed of operation keys for replay, first forward, rewinding, AMS search, stop, record and so on, operation keys for setting a variety of operation modes, operation keys for conducting a variety of editing processes, and so on.

Figure 4:
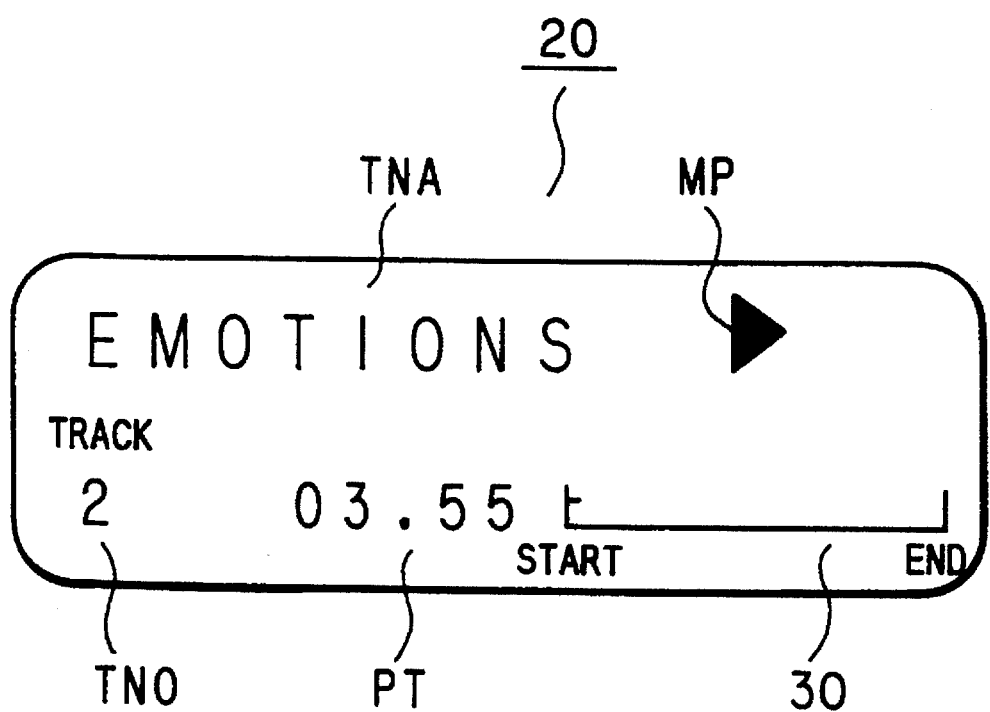
FIG. 4 is a diagram showing a display unit of the recording and/or reproducing apparatus in accordance with the embodiment of the invention.

A reference numeral 20 denotes a display unit, for example, composed of a liquid-crystal display element and so on. The display unit 20 performs the display of an operating state, a mode state, a reproduction progress period of time, a record progress period of time, a track number and so on under the control of the system controller 11. FIG. 4 shows a concrete example of the display unit 20 in which, for example, a tune name indication TNA, a track number indication TNO, a reproduction or recording progress time indication PT, and a symbol indication MP representative of operation modes are displayed. In FIG. 4, a triangular symbol representative of reproduction is displayed as the symbol indication MP representative of the operation mode. A reference numeral 30 denotes a position pointer which indicates a total quantity of data such as tunes recorded on the disc as well as a recording/reproduction position in the form of a symbol, which is a feature of this embodiment. The position pointer 30 will be described later.

In FIG. 3, in executing the recording/reproducing operation with respect to the disc 1, a management information recorded in the disc 1, that is, a P-TOC (pre-recorded TOC) and a U-TOC are read out, and the system controller 11 discriminates the addresses of parts to be recorded on the disc 1 or the addresses of parts to be reproduced thereon in accordance with those management information. The management information is held in the buffer memory 13. For this reason, the buffer memory 13 is divided into a buffer area for the foregoing recorded data/reproduced data and an area in which those management information are held.

In this embodiment, an S-RAM (Static RAM) 11a is provided in the system controller 11. The S-RAM 11 is designed so that, for example, the resume point data and so on, which are representative of the reproduction position on the loaded disc at a point of time where the stop key is operated, are stored and held.

The system controller 11 controls the respective elements so as to read out those management information and so on by executing the reproducing operation on the innermost periphery side of the disc on which the management information have been recorded when the disc 1 has been loaded in the apparatus, and to store the management information in the buffer memory 13. After then, the management information stored in the buffer memory 13 is referred to at the time of conducting the recording/reproducing operation with respect to the disc 1.

The information of the U-TOC is edited and rewritten in accordance with recording or erasing of data with respect to the magneto-optical disc 1. The system controller 11 edits the U-TOC information stored in the buffer memory 13 every recording/erasing operation, and in accordance with that operation of rewriting the U-TOC information, the system controller 11 rewrites the U-TOC information in the U-TOC area of the disc 1 at a predetermined timing, likewise.

(2. P-TOC sector)

First, a description will be given of the P-TOC sector, shown in FIG. 5, as the audio data sector recorded in the form of sector data as well as the management information for conducting the management of the recording/reproducing operation for the audio data in the disc 1.

The P-TOC information is for designation of an area such as a recordable area of the disc (recordable user's area) or for management of the U-TOC area. In the case where the disc 1 is an optical disc only for reproduction, a tune which has been recorded in the form of the physical pits as in a compact disc can be managed by the P-TOC.

FIG. 5 shows the format of the P-TOC. FIG. 5 shows one sector (sector 0) of P-TOC information which is repeatedly recorded in a P-TOC area, for example, in an area on the innermost peripheral side of the disc. The description of the sector 1 and the following sectors of the P-TOC format will be omitted.

The data area (4 bytes×588=2352 bytes) in the sector of a P-TOC have a header where 4 bytes of addresses representative of cluster addresses and sector addresses, and so on are added to a synchronizing pattern consisting of 1-byte data of all 0's or all 1's at a top position. The area of the P-TOC is indicated by that header.

An identification ID using the ASCII code corresponding to the character "MINI" is added at a predetermined address position following to the header.

Successively, a disc type, a record level, the first tune number (First TNO) of a first tune recorded, the final tune number (Final TNO) of a final tune, a read-out start address ROA, the start address PCA of a power calibration area, the start address USTA of the U-TOC (data area of the U-TOC sector 0 in FIG. 6, which will be described), the start address RSTA of a recordable area (recordable user's area), and so on are recorded in the data area.

Successively, a corresponding table indicating data section having table pointers (P-TNO1 to P-TNO255) which makes the respective recorded tunes associated with part tables in a management table portion which will be described later is provided.

Subsequent to the corresponding table indicating data section, the management table portion providing 255 part tables of (01h) to (FFh) therein in correspondence with the table pointers (P-TN01 to P-TN0255) in the corresponding table indicating data section is provided. In this specification, a numeric value to which "h" is attached is represented by the so-called sexadecimal notation. In the respective part tables, a start address representative of a start point of a certain part (track), an end address representative of an end point thereof and a mode information (track mode) on that part (track) can be recorded in the data area. The "part" means a track portion where time-continuous data has been physically continuously recorded. For example, it is directed to a track portion indicated by $M_1$, $M_{4(4)}$ or the like in FIG. 1.

The mode information of a track in each part table are information on whether its part is set to, for example, an over-write prohibition or a data copy prohibition, or not, on whether it is audio information or not, on the kind of monophonic or stereophonic, etc.

The respective part tables of (01h) to (FFh) in the management table section allow their part contents to be indicated by the table pointers (P-TNO1 to P-TNO255) in the corresponding table indicating data section. That is, a certain table (for example, (01h). In fact, a numeric value capable of indicating a certain part table at a byte position within the P-TOC sector 0 is mentioned in a table pointer by a predetermined processing has been recorded as a table pointer P-TH01 for the first tune. In this example, the start address of the part table (01 h) is of a start address at the recording position of the first tune, and similarly the end address thereof is of an end address at the position where the first tune has been recorded. Also, the track mode information is information on the first tune.

Similarly to the first tune, the start address and end address at the recording position of the second tune and the track mode information on the second tune have been recorded in the part table indicated by the table pointer P-TNO2, for example, (02h), for the second tune.

Because the table pointers have been provided until P-TNO255 in the same manner, the 255-th tune can be managed in form of the P-TOC at the maximum.

As described above, with the structure of the P-TOC sector 0, for example, in reproduction of a magneto-optical disc or a disc loaded in the apparatus, reproduction can be executed by accessing to a predetermined tune.

In the case of a magneto-optical disc capable of conducting recording and reproduction, since there is no tune area of data which has been recorded in the form of pits as in a compact disc, the foregoing corresponding table indicating data section and management table section are not used. As a result, "00 h" has been recorded in all of the respective bytes.

In a disc of the pre-recorded type where all tunes have been recorded by using pits as well as a disc of the hybrid type providing both of a ROM area and a recordable area as an area in which a tune and so on are recorded, the foregoing corresponding table indicating data section and management table section are used for the management of tunes within the ROM area. In the ROM area, data of a tune and so on have been recorded in the form of pits. In the recordable area, a recording material such as a magneto-optical recording material is formed into a thin film so that data desired by the user can be recorded in the recordable area.

(3. U-TOC sector)

Subsequently, a description will be given of a U-TOC. FIG. 6 shows the format of one sector (sector 0) of the U-TOC, where data of management information on a tune which has been recorded by the user and an unrecorded area (free area) in which a tune can be newly recorded has been recorded. Sector 1 and the following sectors in the U-TOC are optional, but its description will be omitted.

For example, in recording a certain tune in the disc 1, the system controller 11 controls the respective elements of the apparatus such as the optical head 3 so as to search a free area on the disc from information recorded in the U-TOC to record audio data in the searched free area. Also, in reproducing, the system controller 11 controls the respective elements so as to discriminate an area in which a tune to be reproduced has been recorded from the information of the U-TOC to gain access to that area, thereby conducting the reproducing operation.

In the sector (sector 0) of the U-TOC shown in FIG. 6, similarly to the P-TOC, there is first provided a header. Subsequently to the header, data of a maker code, a model code, the tune number of a first tune (First TNO), the tune number of a last tune (Last TNO), a sector use state, a disc serial number, a disc ID and so on has been recorded at a predetermined address position. Further, in the sector 0 of the U-TOC, there are provided areas in which a variety of table pointers (P-DFA, P-EMPTY, P-FRA, P-TNO1 to P-TNO255) are recorded as a corresponding table indicating data section in order to discriminate the area of a tune recorded by the user, an unrecorded area and so on by making them associated with the management table section which will be described later.

255 part tables of (01 h) to (FFh) are provided as the management table section corresponding to the table pointers (P-DFA to P-TNO255) in the corresponding table indicating data section. In the respective part tables, likewise as the P-TOC sector 0 shown in FIG. 4, a start address of a start point of a certain part, an end address of an end point thereof and a mode information (track mode) on that part have been recorded. Further, in the U-TOC sector 0, because there is a case where a part indicated by each part table is continuously linked to another part, link information representing a part table in which a start address and end address of the linked parts have been recorded can be recorded.

In the recording and/or reproducing apparatus shown in FIG. 3, as described above, even though data of one tune has physically discontinuously been recorded, that is, recorded over a plurality of parts, this does not interfere with the reproducing operation by reproducing while accessing between parts. For that reason, there is a case where a tune or the like to be recorded by the user is recorded separately by a plurality of parts for the purpose of improving the efficiency of the recordable area in use. Therefore, link information is provided in the U-TOC information, for example, so that the part tables can be linked together by designating part tables to be coupled by the numbers (01h) to (FFh) which are in fact represented by numeric values which are byte positions within the U-TOC sector 0 through a predetermined processing) given to the respective part tables. Since the tune or the like, which is recorded in the form of a physical concave/convex, that is, pits, is not normally divided into parts, all link information is "00 h" in the P-TOC sector 0 as shown in FIG. 5.

In other words, in the management table section of the U-TOC sector 0, one part table represents one part. For example, the part position of a tune organized by linking three parts together is managed by three part tables linked together by link information.

In the respective part tables of (01h) to (FFh) in the management table section of the U-TOC sector 0, the part contents are indicated by the table pointers (P-DFA, P-EMPTY, P-FRA, P-TNO1 to P-TNO255) in the corresponding table indicating data section as stated below.

The table pointer P-DFA represents a defective area on the magneto-optical disc 1 and designates one part table indicated by a track portion (=part) which is of the defective area caused by a damage or the like, or a top part table within a plurality of part tables. In other words, if a defective part exists, any one of (01h) to (FFh) is recorded in the table pointer P-DFA. The start and end addresses of the defective part have been recorded in the part table designated by the table pointer P-DFA. If another defective part exists, another defective part table is designated as the link information of the defective part table, and the linked defective part is indicated in that part table similarly. If no other defective linked parts exist, link information is, for example, "00 h", which represents no defective linked part following to that part.

The table pointer P-EMPTY represents one part table or a top part table of a plurality of unused part tables in the management table section. If an unused part table exists, any one of (01h) to (FFh) is recorded as the table pointer P-EMPTY. If a plurality of unused part tables exist, part tables are sequentially designated from the part tables designated by the table pointer P-EMPTY by link information so that all of the unused part tables are coupled together on the management table section.

The table pointer P-FRA represents a data-rewriteable free area including a data-erased area on the magneto-optical disc 1, and designates one part table or a top part table within a plurality of part tables, which represents a track portion (=part) forming the free area. In other words, if a free area exists, any one of (01h) to (FFh) has been recorded in the table pointer P-FRA. In the table designated by the table pointer P-FRA, a part forming a free area is represented by its start and end addresses. If a plurality of part tables exist, the following part tables are sequentially designated until a part table having link information of "(00h)" by the link information so that a plurality of part tables are linked together.

FIG. 7 is a schematic diagram showing the state of managing the parts forming free areas by the part tables. FIG. 7 shows a state where, when the parts (03h), (18h), (1Fn), (2Bh) and (E3h) are of free areas, this state is linked together by link information of the part tables (03h), (18h), (1Fh), (2Bh) and (E3h) subsequently to the corresponding table indicating data P-FRA. The form of managing the foregoing defective area and the unused part table is the same as that of the free area.

In the case of a magneto-optical disc on which audio data such as a tune is not entirely recorded and which has no defective portion, the part table (01h) is designated by the table pointer P-FRA. This indicates that the whole recordable user's areas of the disc are of unrecorded areas (free areas). In this case, because the remaining part tables (02h) to (FFh) are not used, the respective part tables are designated by link formation until the part table (FFh) is linked in such a manner that the part table (02h) is designated by the foregoing table pointer P-EMPTY, the part table (03h) is designated as link information of the part table (02h) and the part table (04h) is designated as link information of the part table (03h). In this case, the link information of the part table (FFh) is "(00h)" indicative of no link subsequent to this table.

In this situation, in the part table (01h), a start address of the recordable user's area has been recorded as its start address, and an address immediately before the read-out start address has been recorded as its end address.

In the table pointers P-TNO1 to TNO255, a part table which is positioned in time base at a top of part tables for a tune which has been recorded on the magneto-optical disc 1 by the user has been recorded. For example, the table pointer P-TNO1 designates a part table of one part or a part which is positioned at a top of a plurality of parts in time base, in which data of a first tune has been recorded.

For example, in the case where a first tune is recorded at one part on the disc without being divided into a plurality of parts, the recording area for the first tune is an area represented by a start address and an end address of the part table which is indicated by the table pointer P-TNO1.

For example, in the case where a second tune is recorded discretely at a plurality of parts on the disc, the respective parts are designated in accordance with a time sequence for indicating the recording position of that tune. In other words, other part tables are successively designated in accordance with a time sequence by the link information of a part table which is positioned in time base at a top of the part tables designated by the table pointer P-TNO2. The part tables are linked together until a part table having link information of "(00h)". In reproducing the second tune or over-writing on the area of the second tune using data of the U-TOC sector 0, a continuous music information can be extracted from discrete parts by the access operation of the optical head 3 and the magnetic head 6. Thus, recording effectively using the recording area can be performed.

As described above, the management of an area on the disc is made by the information of the P-TOC, and a recorded tune, a free area and so on in the recordable user's area are managed by the information of the U-TOC.

Those TOC information are read in the buffer memory 13 so that the system controller 11 can refer to that TOC information.

(4. An example of display operation of position pointer)

Subsequently, a description will be given of an example of the display operation of a position pointer 30 in the display unit 20 of the recording and/or reproducing apparatus in accordance with the embodiment of the present invention.

FIGS. 8(a) to 8(e) show an example of the display operation relating to a disc reproducing mode.

First, for example, in the case where a main power supply is off (a so-called sleep state where power is supplied to at least the system controller 11), the position pointer 30 is not entirely indicated on the display unit 20.

Figure 8A:
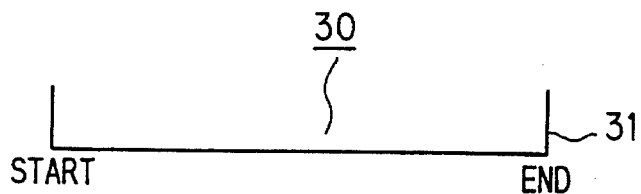
FIGS. 8 (a) to 8 (e) are explanatory diagrams showing the display operation of a position pointer during the reproducing operation in accordance with the embodiment of the invention.

In this situation, for example, if a key other than a stop key in the operating input section 19 is operated, a state shown in FIG. 8(a) is indicated as the position pointer 30 on the display unit 20. In other words, only a position frame 31 of the position pointer 30 is first indicated on the display unit 20. The position frame 31 composes of, for example, one segment. A start position and an end position of the disc are indicated by "START" and "END" shown.

During a period of time when only the position frame 31 is displayed, the system controller 11 conducts the operation and processing of reading the TOC information of the disc as well as data of a resume point stored in an S-RAM 11a, and so on. In the case where the TOC information is not obtained, it is judged that a disc is not loaded in the apparatus, and the indication of only the position frame 31 shown in FIG. 8(a) is continued.

Figure 8B:
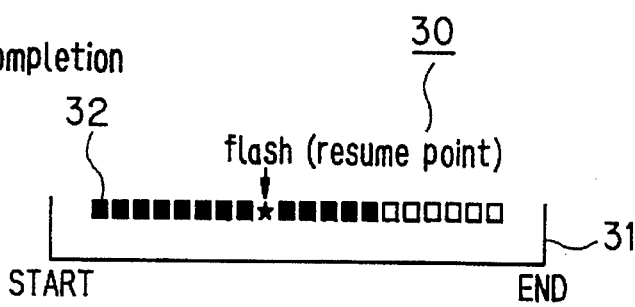

After the disc has been already installed in the apparatus and reading of the TOC information of the disc has been completed, if the loaded disc is of a recordable magneto-optical disc, the position pointer 30 is indicated, for example, as shown in FIG. 8(b). If the disc loaded in the apparatus is a pre-recorded disc in which a tune has been recorded as data in the form of pits as in a compact disc, an indication shown in FIG. 8 (c) is conducted.

In FIGS. 8(b) to 8(e), a reference numeral 32 denotes dots of display segments, and in this embodiment, 20 dots in total are provided within the position frame 31. In FIGS. 8(b) to 8(e), the black dots 32 represent lighted states whereas void dots 32 actually represent blackout states. The total capacity of data of a tune recorded on the disc is indicated by the number of the lighted dots 32 from the start position.

A star mark actually represents a state in which the dot 32 is flashed, and represents a current reproduction position of the disc in the time axial direction during the reproduction of the disc loaded in the apparatus. The current reproduction position of the disc which is indicated immediately after the completion of reading the TOC information represents the foregoing resume point, for example, a reproduction position immediately before the previous power supply is turned off.

In other words, FIG. 8(b) shows that data of a tune having a capacity represented as a ratio of the lighted dot number/the total dot number =14/20 has been already recorded in the magneto-optical disc. Furthermore, the star shaped dot 32 at the position shown in FIG. 8(b) is flashed on the basis of the resume point data recorded in the S-RAM 11a, thereby indicating that the position is at a resume point. If a tune is recorded as data so as to be filled to the recordable capacity of the disc, all the dots 32 of 20 segments are lighted. In other words, The display state is the same as that in FIG. 8(c) which will be described below.

In other words, the total capacity of the disc is represented by 20 dots. For example, in the case where a recordable capacity for a tune as data is converted into a period of time, in a disc having a recordable period of 60 minutes, 60 minutes are constituted by 20 dots (one dot corresponds to 3 minutes), and in a disc having a recordable period of 74 minutes, 74 minutes are constituted by 20 dots (one dot corresponds to 3 minutes and 42 seconds).

In the case where data has not been recorded at all in the magneto-optical disc installed in the apparatus, for example, all the dots 32 are not lighted, but the dot 32 at the start position is flashed. In other words, the range of dots which are not lighted, for example, the number of dots 32 indicated by voids in FIG. 8(b) corresponds to the capacity of the free area.

Figure 8C:
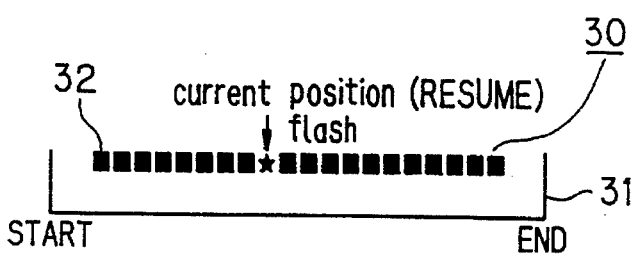

The display state shown in FIG. 8(c) is an example of display in the case of a pre-recorded disc. Because the pre-recorded disc does not allow a tune to be newly recorded by the user, it is regarded that data has already been recorded in the disc so as to be filled to its capacity. Therefore, as shown in FIG. 8(c), all of 20 dots are lighted and a dot 32 corresponding to the resume point is flashed.

In the case where any operation is not conducted after the disc has been loaded in the apparatus in any state of FIG. 8(b) or 8(c), the dot 32 at the topmost position is flashed, thereby indicating that the current reproduction position is at a first position within the recorded area.

The operation of reproduction, AMS (automatic music scan), fast forward/rewind or the like is conducted from the state of FIG. 8(b) or 8(c) in accordance with the manipulation of any key on the operating input section 19. On the basis of that operation, the flash position is displayed so as to be moved to another dot 32 toward any horizontal direction indicated by arrows in FIG. 8(d). In the case where the reproduction pause key is operated so that the recording and/or reproduction apparatus is in a pause state, the dot 32 which has been flashed when the pause state has been set is flashed without the flash of the current reproduction position being moved.

Figure 8D:
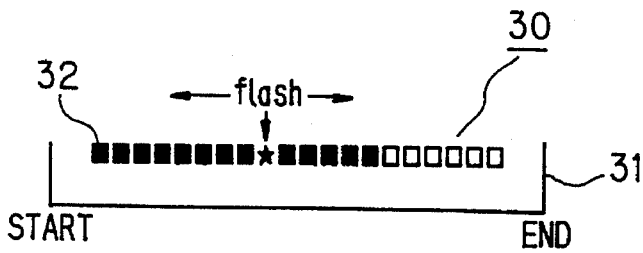
Figure 8E:
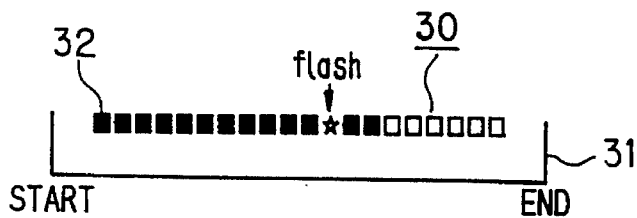

For example, in the case where the stop key is operated after the operation of reproduction, AMS, fast forward/ rewind or the like has been conducted from the state of FIG. 8(d), the dot 32 corresponding to the disc reproduction position when the stop key has been operated is flashed as shown in FIG. 8(e). Compared with FIG. 8 (d), FIG. 8 (e) shows that the flash dot 32 is moved toward an end direction, and therefore the state shown in FIG. 8(e) is regarded as a state in which the stop key is operated while, for example, the operation of reproduction, first forward or AMS toward the progress time direction is being conducted.

At the disc reproduction position when the stop key is operated, address data recorded in the disc, that is, address data from the address decoder is stored as the resume point in the S-RAM 11a.

A description will be given of the display operation in the case where a tune is recorded on a disc loaded in the recording and/or reproducing apparatus with reference to FIGS. 9(a) to 9(d).

In the recording and/or reproducing apparatus of this embodiment, as described above, the pre-recorded disc does not allow new data to be recorded whereas the magneto-optical disc allows a new tune to be recorded.

Figure 9A:
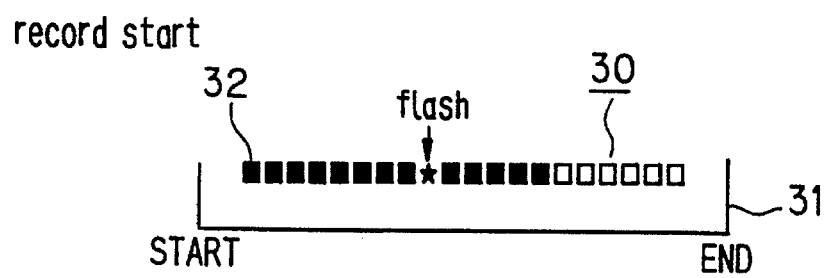
FIGS. 9(a) to 9(d) are explanatory diagrams showing the display operation of the position pointer during the recording operation in accordance with the embodiment of the invention.
Figure 9B:
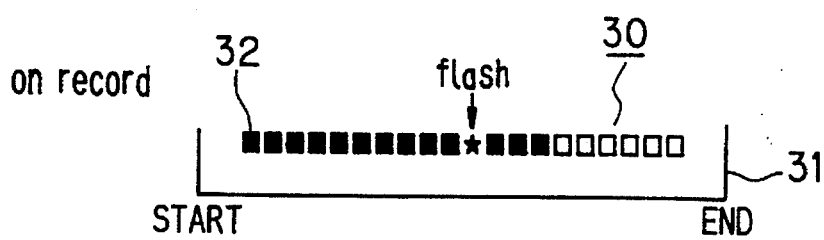

For example, it is assume a that the recording operation is started from the state where reading of the TOC information the disc has been completed shown in FIG. 8(b). In this case, data such as a tune recorded on the magneto-optical disc is instantly erased from a position where the previously recorded data is indicated by a flash position so that data is newly over-written thereon. The display form of the position pointer 30 at this time starts from the state shown in FIG. 9(a), and allows the flash position of the dot 32 to be moved toward the end direction, that is, in the rightwise direction in FIG. 9(b) in accordance with the quantity of data which is newly recorded on the magneto-optical disc as shown in FIG. 9(b) with the recording operation being continued, thereby indicating the current recording position on the magnetic disc.

Figure 9C:
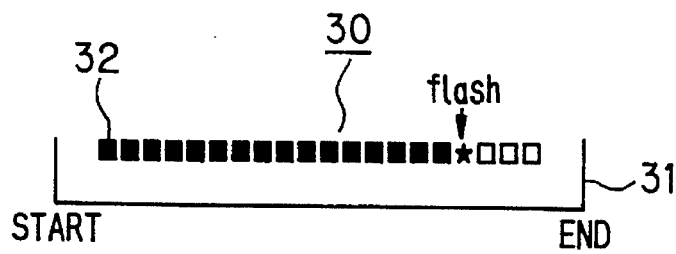
Figure 9D:
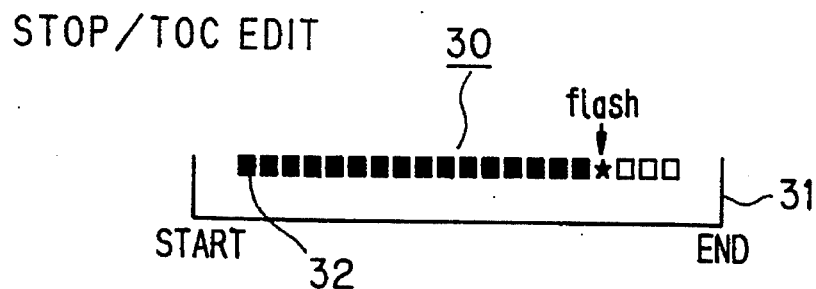

In the case where data is newly recorded exceeding a range where data has already been recorded before the start of the current recording operation by continuing the recording of data on the magneto-optical disc, as shown in FIG. 9(c), the dots 32 which are positioned in time base before the flash position of the dot 32 indicating the current position, that is, all the dots 32 which are positioned at the left side of the dot 32 indicating the current position in FIG. 9(c) are lighted. Subsequently, when the stop key in the operating input section 19 is operated under the state shown in FIG. 9(c) to stop the recording operation, the display shown in FIG. 9(d) is continued on the display unit 20. At this time, the U-TOC information for managing a tune which has been recorded on the magneto-optical disc as data is edited.

(5. A method of calculating the current position as well as the capacity of recorded data for display of a position pointer)

A description will be given of a method of calculating the current position as well as the capacity of recorded data for display of a position pointer in the system controller 11 for realizing display of an amount of recorded data on the disc as well as display of the current position of the position pointer 30 with reference to FIGS. 8 (a) to 9 (d) .

As described above, the recording and/or reproducing apparatus of the present invention enables both of the magneto-optical disc and the pre-recorded disc to be reproduced, and enables a tune as data to be recorded on the magneto-optical disc. First, a description will be given of a calculating method in the case of the magneto-optical disc with reference to FIG. 10.

a. A case of magneto-optical disc

FIG. 10 is a schematic diagram showing the recording state of a tune as data on the magneto-optical disc. In this example, the tune recording state shown in the figure is segmented into each part having one part table. In FIG. 10, the area from the start position indicated by "START" to the end position indicated by "END" corresponds to the total recording capacity of the whole disc on which a tune can be recorded as data. In FIG. 10, a position indicated by an arrow A designates a current position, and for example, the data at this position is currently processed as recorded or reproduced audio data in the buffer memory 13. Hereinafter, the position indicated by that arrow A is called "current header".

In conducting the display of the position pointer 30 for the magneto-optical disc, the system controller 11 first calculates a current position (resume point) and each data of a recorded data capacity and an unrecorded (free area) capacity.

For example, first, in order to obtain current position data, the number of sound groups (refer to FIG. 1) contained in a range of from a header (indicated by an arrow B) of parts (called current parts) to the position of a current head indicated by the arrow A to the actual current header, that is, a range between the arrows A and B is calculated. The calculated number is set as PP.SG data. The method of calculating the PP.SG data is achieved by subtracting the start address of the part table representing the current part on the U-TOC from the address of the current header.

Further, the number of the sound groups from the start position of the disc to a final position before one part from the current part, that is, in a range between "start" and the position indicated by the arrow B in FIG. 10 are calculated, and the calculated number is set as PO.SG data. The method of calculating the PO.SG data is achieved by multiplying the values obtained by subtracting the start address from the end address for each part until the arrow B through the part table of the U-TOC.

The RESUME.SG data is obtained by adding the PP.SG data to the PO.SG data. The RESUME data is of representative of the number of sound groups existing from the start position to the current position (resume point). The current position can be always discriminated by using a calculating method even though the current head is moved by the recording/reproducing operation or the like. The data of a resume point set to the S-RAM 11a after the operation of the stop key may be obtained, for example, by using the RESUME.SG data.

The recorded capacity of the disc on which a tune has been recorded as data is obtained by converting it into the total number of sound groups contained from the start position to the final part (START to arrow C) disposed at the final position when the tune has been recorded on the disc, that is in the range from "START" to the portion indicated by the arrow C in FIG. 10. Here the data quantity thus obtained is called "RECORDED.SG data". Further, the unrecorded (free area) capacity is calculated by converting the unrecorded area in the actual disc into the number of sound groups contained in the range of from the position indicated by the arrow C to "END" in FIG. 10. Here, the data thus obtained is called "FRA.SG data". Those calculating methods are enabled by the U-TOC information.

Subsequently, after the RESUME.SG data (=PO.SG+ PP.SG), RECORDED.SG data and FRA.SG data are obtained by the foregoing calculating method, conversion is conducted for allowing the recorded data quantity, the current position and so on to be displayed in the form of dots on the position pointer 30 on the basis of the above data.

For example, a description will be given of a display example shown in FIGS. 8(a) to 9(d). The flash display position (resume point) RSM.P of the dot 32 representative of the current position is obtained by the following expression:

$$RSM.P = RESUME.SG/(RECORDED.SG+FRA.SG) \times 20 \quad (20 = \text{the total number of dots 32}) \quad (1)$$

Starting from the start position, the dot 32 at the position corresponding to the value of the RSM.P obtained by expression (1) is flashed, whereby the current position is displayed on the display unit 20.

The display number REC.P of dots 32 representative of the recorded data quantity is obtained by the following expression.

$$REC.P = RECORDED.SG/(RECORDED.SG+FRA.SG) \times 20 \quad (2)$$

The dots 32 are lighted from the start position by the number corresponding to the value of the display number REC.P obtained by the calculation result, thereby being capable of indicating the current recorded area.

b. A case of a pre-recorded disc

In the case where the disc loaded in the apparatus is a pre-recorded disc, a tune cannot be recorded on the disc as new data. As a result, for example, in FIG. 10, the RECORDED.SG is from the start position to the end position, which comes to the same state if no FRA.SG exists. In other words, in the case of the magneto-optical disc, it can be considered that a tune as data has been recorded so as to be filled to the storage capacity of the disc.

Accordingly, in the pre-recorded disc, the same calculating method as that in the magneto-optical disc may be used with the value of the FRA.SG data being 0. Therefore, the flash display position (resume point) RSM.P of the dot 32 representative of the current position is obtained by the following expression:

$$RSM.P = RESUME.SG/RECORDED.SG \times 20 \quad (3)$$

By counting the dots 32 corresponding to the value of the RSM.P calculated by using expression (3) from the start position, the current position is indicated.

The display number of dots 32 representative of the recorded data capacity allows all the dots 32 from the start position to the end position to be lighted as shown in FIG. 8(c).

(6. The processing operation for displaying the position pointer)

Figure 11:
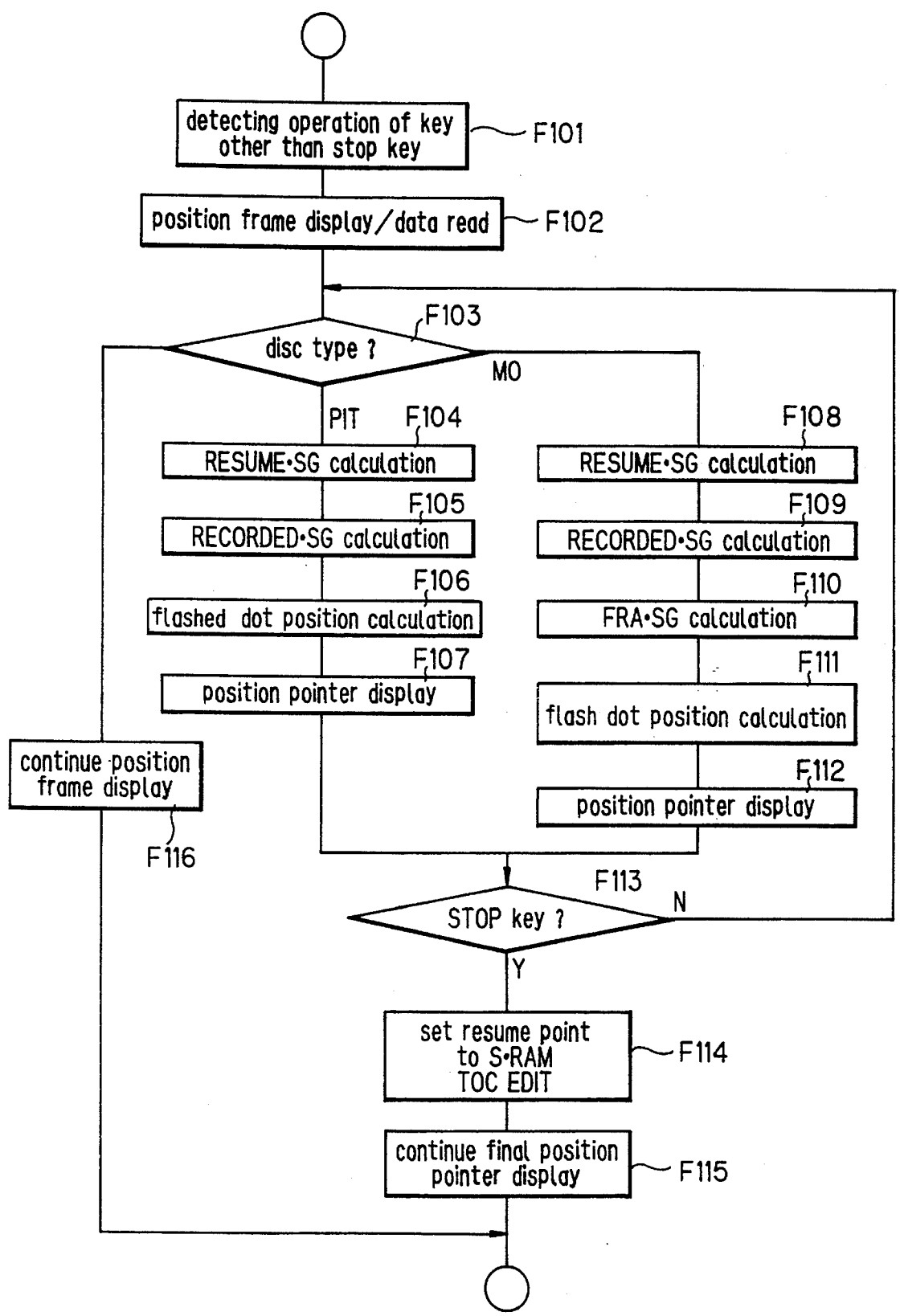
FIG. 11 is a flowchart showing a process for controlling the display of the position pointer in accordance with the embodiment of the invention.

Subsequently, a description will be given of the processing operation of the system controller 11 for realizing the recorded data and the current position indication in the position pointer 30 as shown in FIGS. 8(a) to 9(d) using the foregoing calculation method, with reference to the flowchart shown in FIG. 11.

This flowchart shows only the processing for controlling the display of the position pointer 30, and other display controls such as symbol display representative of a performance time and an operating state which are simultaneously progressed in fact are omitted here. The flowchart of processing for controlling the display of the position pointer 30 is stored in a ROM within the system controller 11.

In this routine, if the system controller 11 discriminates that any key other than the stop key was operated (F101), the control proceeds to step F102. First, the display unit 20 is controlled so that the position frame 31 is displayed as shown in FIG. 8(a), and data is read. Here, the read data means the operation of reading into the system controller 11 data such as P-TOC information and U-TOC information stored in at least a disc, and a resume point stored in the S-RAM 11a. Then, the system controller 11 discriminates whether the disc loaded in the apparatus is a pre-recorded disc or a magneto-optical disc, that is, the kind of the disc, on the basis of the P-TOC information or U-TOC information read in step F102, in step F103.

If the P-TOC or U-TOC information is not read in step F103, it is discriminated that the disc has not been loaded in the apparatus, and the control proceeds to step F116. In step F116, the display of the position frame 31 on the display unit 20 in step F102 is continued, and the control returns to the home routine.

Alternatively, if it is discriminated that the pre-recorded disc has been loaded in the apparatus in step F103, the control proceeds to step F104. In step F104, the RESUME.SG data which is at the current position is calculated, and the RECORDED.SG data is calculated in step F105. The arithmetic operation represented by expression (3) is executed in step F106 on the basis of the RESUME.SG data and the RECORDED.SG data calculated in step F105, to obtain the flash position of the dot 32. Then, the control proceeds to step F107.

In step F107, the recorded data capacity and current position in the position pointer 30 are indicated on the display unit 20. In other words, since the disc presently loaded in the apparatus is of a pre-recorded disc, all the display dots 32 are lighted. Also, the dot 32 selected on the basis of the data calculated in step F106 is flashed to indicate the current position, and the control proceeds to step F113.

Alternatively, if it is discriminated in step F103 that the disc loaded in the apparatus is of a magneto-optical disc, the control proceeds to step F108 in which the RESUME.SG data representative of the current position is calculated. Subsequently, the control proceeds to step F109 in which the RECORDED.SG data is calculated. Furthermore, in this situation, FRA.SG data is calculated in step F110. The arithmetic operation represented by expressions (1) and (2) is executed on the basis of the thus calculated RESUME.SG data, RECORDED.SG data and FRA-SG data, thereby calculating the flash position of the dot 32 (resume point) and the number of dots representative of the recorded data capacity in step F111. Then, the control proceeds to step F112.

In the step F112, the dot 32 corresponding to the flash display position RSM.P calculated in step F111 is flashed, and the dots 32 of the number corresponding to the display number REC.P of dots 32 of the recorded data quantity are lighted. Then, the control proceeds to step F113.

In step F113, it is discriminated whether the stop key of the operating input section 19 has been operated or not. If it is discriminated that no stop key is operated in step F113, the control returns to step F103 whereby the position pointer 30 is continuously displayed on the display unit 20. For example, during the reproduction or recording of the disc, the flashed dot 32 is moved in accordance with the change of the current position and the number of dots 32 to be lighted is changed in accordance with the change of the data capacity of the recorded area until the stop key is operated.

If it is discriminated in step F113 that the stop key has been operated, the control proceeds to step F114, in which data of the resume point at the time of operating the stop key, for example, the address data of the disc is stored in the S-RAM 11a. If the operating state of the apparatus before the stop key is operated was of the recording operation, the U-TOC information corresponding to a tune which has been newly recorded as data on the disc is edited before the control proceeds to step F115.

In step F115, the processing for continuing the display of the position pointer 30 at the time when the stop key was operated is conducted, and thereafter the control returns to, for example, the main routine.

Thereafter, if the power of the apparatus is turned off by operating the power switch in the operating input section 19, that is, it comes to a sleep state, for example, the display of the position pointer 30 together with other display is stopped. The data of the resume point when the stop key was operated is stored and held in the S-RAM 11a so far as the disc is not ejected from the apparatus.

(7. Examples of various modifications of the display operation of the position pointer)

A description will be given of modified examples of the display operation of the position pointer 30 with reference to FIGS. 12(a) to 16(b).

FIGS. 12(a) to 12(d) show the display form when a tune recorded on the disc is reproduced as another example of the display operation. The same parts as those in FIGS. 8(a) to 8(e) showing the display form in the reproducing mode in the foregoing embodiment are designated by the identical references. Here, their detailed description is omitted.

Figure 12A:
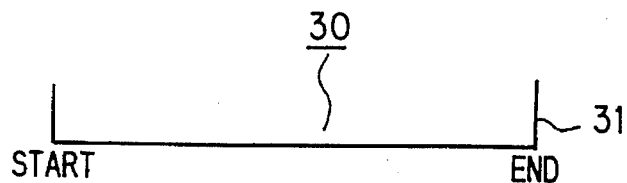
FIGS. 12(a) to 12(d) are explanatory diagrams showing other display operation of the position pointer during the reproducing operation in accordance with the embodiment of the invention.

First, similarly to the display operation of FIGS. 8(a) to 8(e), if it is in a sleep state in FIGS. 12(a) to 12(e), the position pointer 20 is not displayed on the display unit 20 at all. For example, if a key other than the stop key in the operating section 19 provided in the apparatus is operated, only the position frame 31 is displayed on a part of the display unit 20 as shown in FIG. 12(a), during which the P-TOC or U-TOC information of the disc and resume point data are read in the system controller 11 if the resume point data has been stored in the S-RAM 11a. If the system controller 11 judges that a disc is not loaded in the apparatus because the TOC information is not read, only the position frame 31 is continuously displayed on the display unit 20.

Figure 12B:
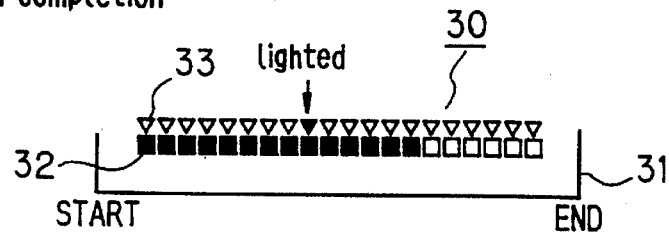

If it is judged that the disc has been loaded in the apparatus, reading the P-TOC or U-TOC information of the disc is completed, and the loaded disc is of a magneto-optical, display, for example, as shown in FIG. 12(b) is conducted.

In FIG. 12(b), inverse triangular dots 33 serving as 20 display segments disposed correspondingly at the upper side of the respective dots 32 are current position display dots for indicating the current position. The void current position display dot 33 indicates a blackout state. In other words, if the reading of the P-TOC or U-TOC information of the disc is completed in this display example, the dots 32 of the number corresponding to a ratio of the data capacity which has already been recorded on the disc to the whole storage capacity of the disc are lighted. Also, the resume point is indicated by lighting the current position display dot 33 which has been selected by the resume point data.

If it is judged that the disc loaded in the apparatus is of a pre-recorded disc, all of 20 dots 32 are lighted as in FIG. 8(c). Similarly, if no operating input section 19 is operated after the disc has been loaded in the apparatus, the current position display dot 33 located at the topmost position, that is, the dot 33 positioned at the leftmost side in FIGS. 12(b) to 12(d) is lighted, thereby indicating that the current position is at a first position within an area where data has already been recorded.

Figure 12C:
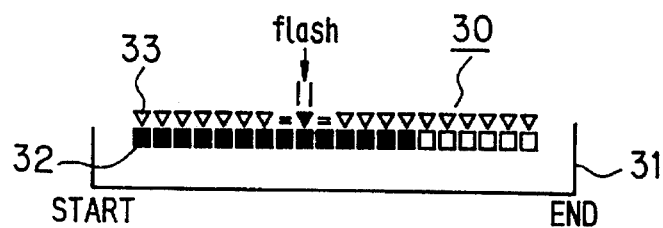

If the operation of reproduction, AMS, fast forward/rewind or the like is conducted from the foregoing state in accordance with a corresponding key operation, the current position display dot 33 is changed from the lighted state to the blackout state in accordance with the operated or set operation as shown in FIG. 12(c), thus indicating a state in which the current position can be changed. Then, the current position display dot 33 is moved toward a direction of "START" or "END" in accordance with the change of the current position while the dot 33 is being flashed. In the case where a replay pause key is operated so that the apparatus becomes in a pause state, the current position display dot 33 which was flashed when the pause key was operated remains flashed without any movement of flashing at the current position.

Figure 12D:
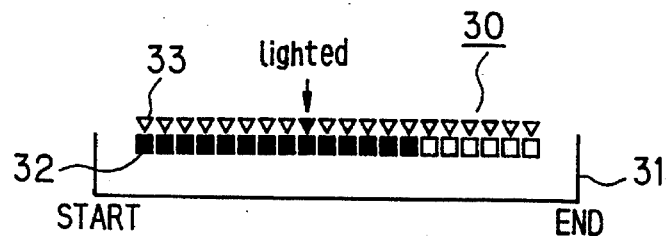

For example, in the case where the stop key is operated after any operation of reproduction, AMS, first forward/rewind or the like has been conducted from the state shown in FIG. 12(c), the current position display dot 33 corresponding to the reproduction position when the stop key was operated is changed from the flash state to the lighted display state, as shown in FIG. 12(d).

Similarly, data relating to the reproduction position when the stop key was operated, for example, disc address data is stored in the as a new resume point in the S-RAM 11a.

Subsequently, a description will be given of a display state at the time of recording a tune as data on a disc in accordance with another example of the display operation, with reference to FIGS. 13(a) to 13(f).

Figure 13A:
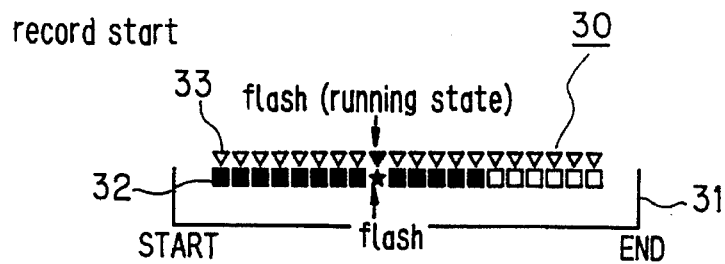
FIGS. 13(a) to 13(f) are explanatory diagrams showing other display operation of the position pointer during the recording operation in accordance with the embodiment of the invention.

For example, if recording of a tune on the disc is started from a state shown in FIG. 12(b) after writing the P-TOC or U-TOC information of the disc has been completed, the current position display dot 33 is changed in the flash state as shown in FIG. 13(a), thereby indicating a state in which the current position can be changed. Also, the dot 32 corresponding to the current position display dot 33 which is flashing is flashed, thereby indicating a state in which recording of the tune has been started from that position. In this situation, the foregoing over-write recording operation in which a new tune is recorded on data which has already been recorded on the disc, that is, the old tune is conducted.

Figure 13B:
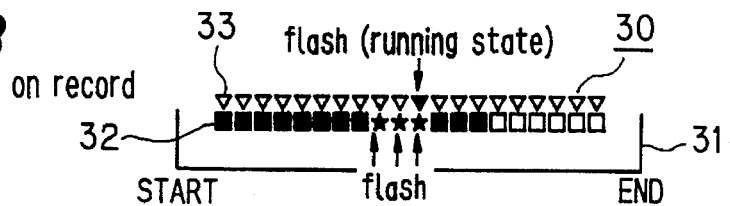

If recording of the tune is continued from that state, the flashing current position display dot 33 is moved toward the direction of "END" as shown in FIG. 13(b). Simultaneously, a plurality of dots 32 corresponding to a recording start position to the current position as shown in FIG. 13(b) are flashed. The range indicated by the flashing dots 32 correspond to an over-written portion.

Figure 13C:
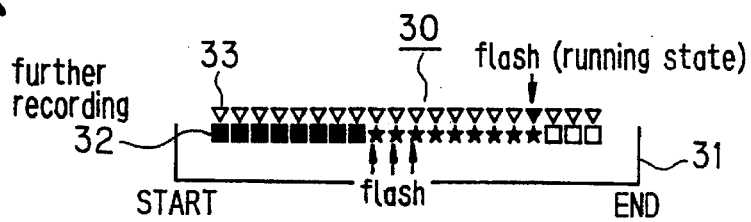

If the operation of recording a new tune is continued so that recording exceeds a range or area in which a tune has already been recorded before the current recording operation starts, void dots 32 existing between the flash position of the current position display dot 33 representative of the current recording position and the final dot 32 of the lighting dots 32 shown in FIG. 13(b), are successively changed into the flash state as shown in FIG. 13(c). This represents a state in which the recorded area where a tune has been recorded is expanded by recording a new tune.

Figure 13D:
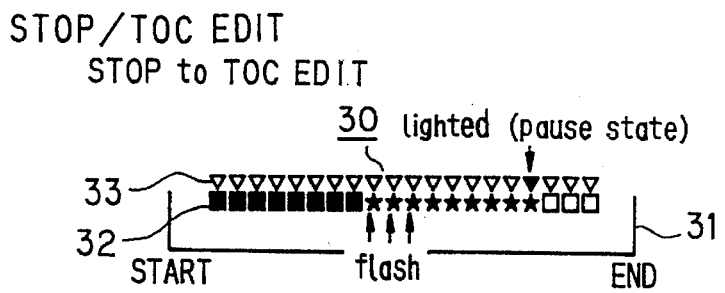
Figure 13E:
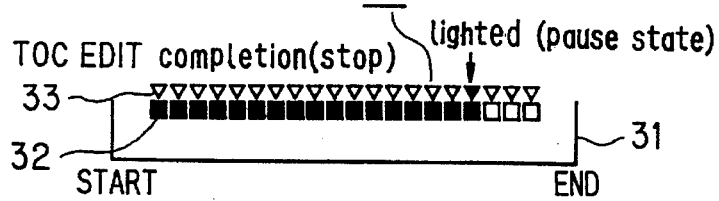

If the recording operation is stopped from the state shown in FIG. 13(c) by operating the stop key, the current position display dot 33 is changed from the flash state to the lighted state as shown in FIG. 13(d). Simultaneously, the range in which the new tune has been recorded is indicated by making a plurality of dots 32 in the flash state. In this situation, the U-TOC information for managing the tune data which has been newly recorded on the disc is edited. Upon the completion of an editing process for the U-TOC information, all the dots 32 between a dot 32 positioned at the head of a plurality of dots 32 through the current recording operation and a dot 32 positioned at the end of those dots 32 are changed over from the flash state to the lighted state as shown in FIG. 13(e), thus indicating that the area in which the new tune data has been recorded is decided as the recorded area in the U-TOC.

Figure 13F:
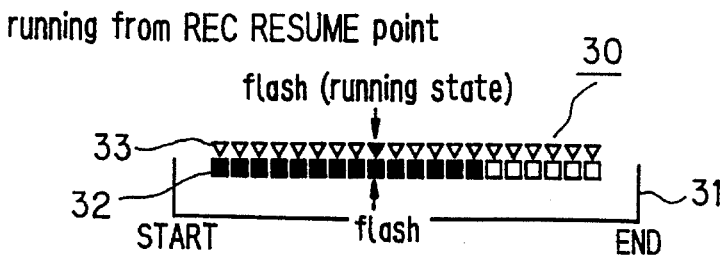

If the reproducing operation is conducted from the foregoing state by operating the replay key, the current position display dot 33 corresponding to the start position of the foregoing recording operation, that is, a REC resume point, is changed into the flash state as if the display of from the final recording point to the start point is moved, as shown in FIG. 13(f). Simultaneously, the current position display dot 33 is successively changed over to the flash display in correspondence with the current reproduction position.

According to the display method shown in FIGS. 13(a) to 13(f), since the state of the recorded capacity and the state of the current position are indicated individually, in particular when an over-write recording where a new tune is recorded on the tune which has already been recorded is conducted, the range in which a tune is newly recorded by changing the display state of the dots 32 as shown in FIGS. 13(b) to 13(d) can be readily grasped.

In control of the foregoing display, the system controller 11 can display the recorded capacity and the current position by the same processing as that in the foregoing embodiment. In order to change the dots 32 in a range where the tune is newly recorded into the flash state as shown in FIGS. 13(b) to 13(d), the start position of newly recording the tune is stored in the S-RAM or the like as the REC resume point data. Alternatively, a memory for storing the REC resume point is provided. The number of sound groups of from the position of the recorded REC resume point to the current position is calculated, and the calculation result is converted into the number of dots through a converting process. The dots 32 may be flashed on the basis of that arithmetic operating result.

Subsequently, a description will be given of an example of another display operation with reference to FIGS. 14(a) to 14(b).

For example, it is assumed that there are magneto-optical discs different in a recordable period of time such as 60 or 74 minutes. It can be discriminated whether the disc loaded into the apparatus is of a disc having a recordable period of 60 minutes or a disc having a recordable period of 74 minutes, for example, on the basis of the capacity of a recordable user's area obtained by data of the recordable user's area start address RSTA as well as the read-out start address ROA which have been recorded in the P-TOC.

Figure 14A:
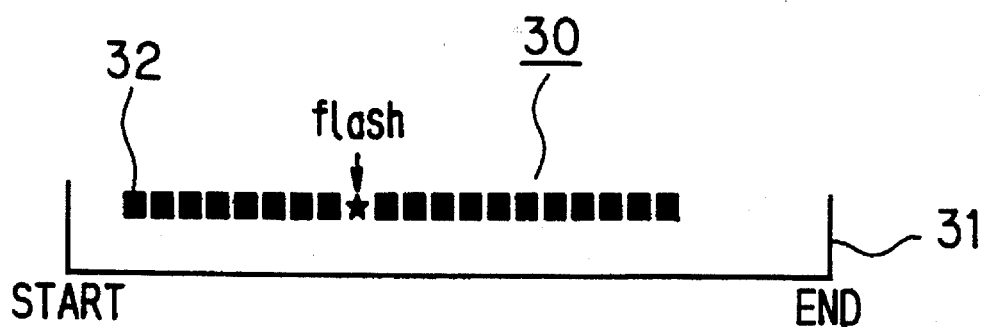
FIGS. 14(a) to 14(b) are explanatory diagrams showing another display operation in accordance with the embodiment of the invention.
Figure 14B:
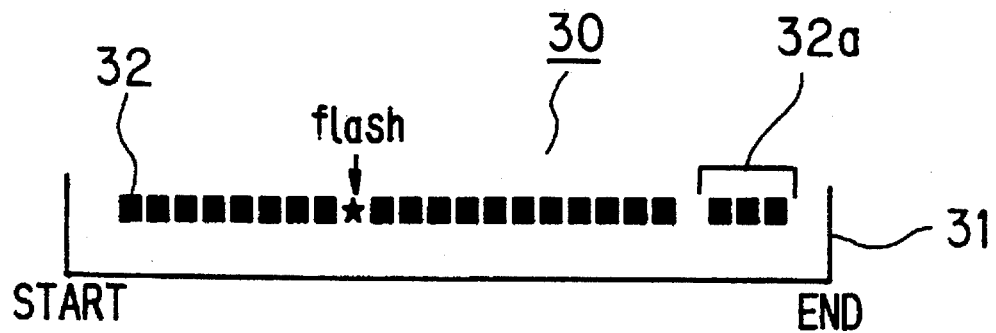

In the display operation shown in FIGS. 8(a) to 8(e) or FIGS. 9(a) to 9(d), the segment number of dots 32 may be changed in accordance with the difference of the recordable period of time, for example, as shown in FIGS. 14(a) to 14(b). That is, concretely, if the loaded disc is of a type in which the recordable period of time is 60 minutes, display using a predetermined number of dots 32, 20 dots 32 in this case, is conducted as shown in FIG. 14(a). If the loaded disc is of a type in which the recordable period of time is 74 minutes, a number of segments are added, for example, as a dots 32a for display. With the above display, the user can readily grasp whether the magneto-optical disc loaded into the recording and/or reproducing apparatus for recording or reproduction is of a type in which the recordable period of time is 60 minutes or a type in which the period is 74 minutes. The number of dots 32 in this example is arbitrary, and the disc to be loaded may be of a disc having a recordable period of time other than 60 and 74 minutes.

In this display form, if the pre-recorded disc is loaded in the apparatus, any state shown in FIG. 14(a) or 14(b) may be displayed in correspondence with the total performance period of time of the pre-recorded disc. Alternatively, the display shown in FIG. 14(a) may be conducted regardless of the total performance period of time.

Figure 15A:
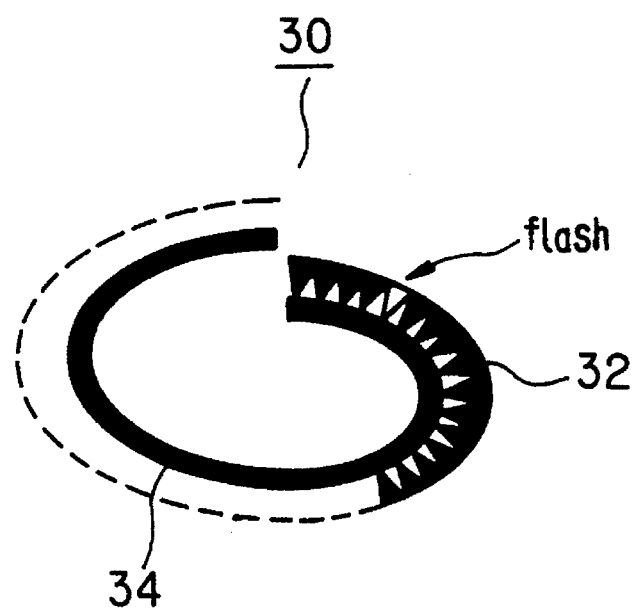
FIGS. 15(a) and 15(b) are explanatory diagrams showing another display operation in accordance with the embodiment of the invention.
Figure 15B:
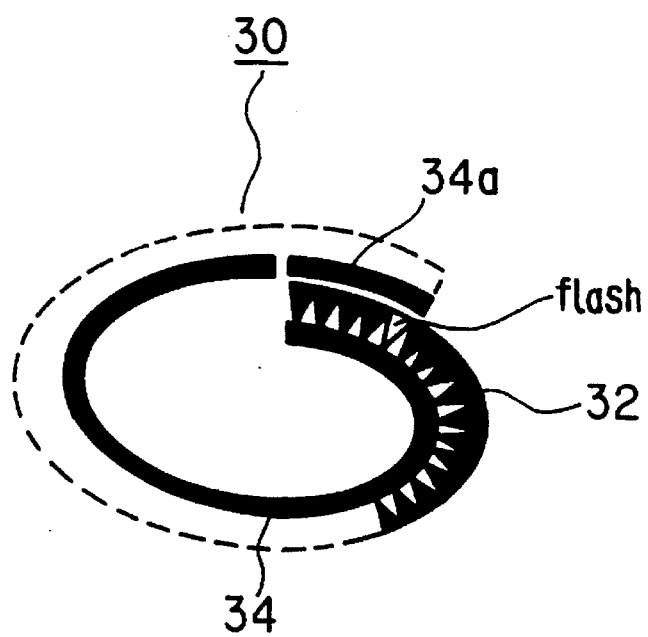

The indication displayed on the display unit 20 is not limited to the straight shape shown in FIGS. 14 (a) and 14(b), but may be of a so-called spiral shape as shown in FIGS. 15(a) and 15(b).

For example, FIGS. 15(a) and 15(b) show display examples in which magneto-optical discs with the recordable period of time being 60 and 70 minutes, respectively, are loaded. In FIGS. 15(a) and 15(b), lighted bar 34 which is in a spiral shape indicates the total recordable period of time during which data can be recorded on the disc. If the magneto-optical disc is of a type in which the recordable period of time is 60 minutes, it is displayed by one turn of the spiral shape as shown in FIG. 15(a). If the magneto-optical disc is of a type in which the recordable period of time is 74 minutes, a bar 34a is added for display as shown in FIG. 15(b), in correspondence with a difference in the recordable period of time between 60 and 74 minutes. For example, the dots 32 are lighted along the bars 34 and 34a in accordance with the data quantity of the recorded tune while the dot 32 indicating the current position is flashed.

In this way, the position pointer 30 is displayed in the spiral shape. As a result, the current position relative to the whole disc and the data recorded period of time relative to the whole recordable period of time can be more readily grasped. In particular, because one turn of the bar 34 corresponds to a time length of 60 minutes, the current position and the data recorded period of time can be readily grasped in real time with feeling as if a person judges time viewing the hour hand of a clock.

Similarly, in this example, if a pre-recorded disc has been loaded into the apparatus, the user can grasp the total recorded period of time recorded on the pre-recorded disc by displaying the indication shown in FIG. 15(a) on the display unit 20.

Figure 16A:
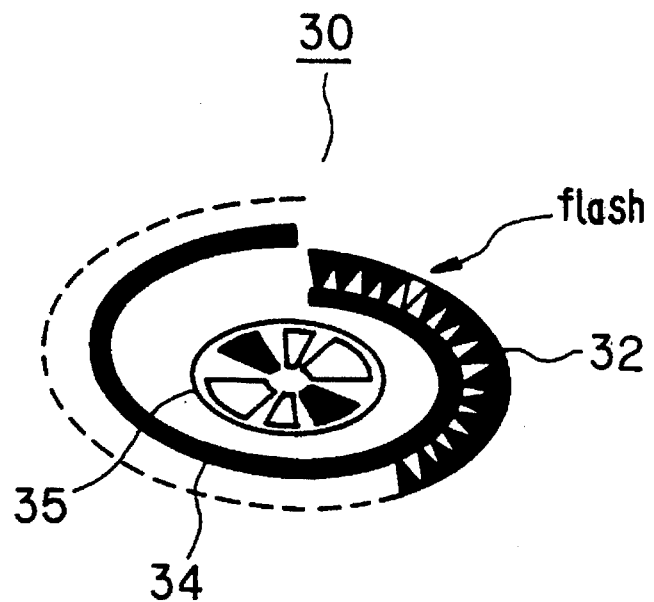
FIGS. 16(a) and 16(b) are explanatory diagrams showing another display operation in accordance with the embodiment of the invention.
Figure 16B:
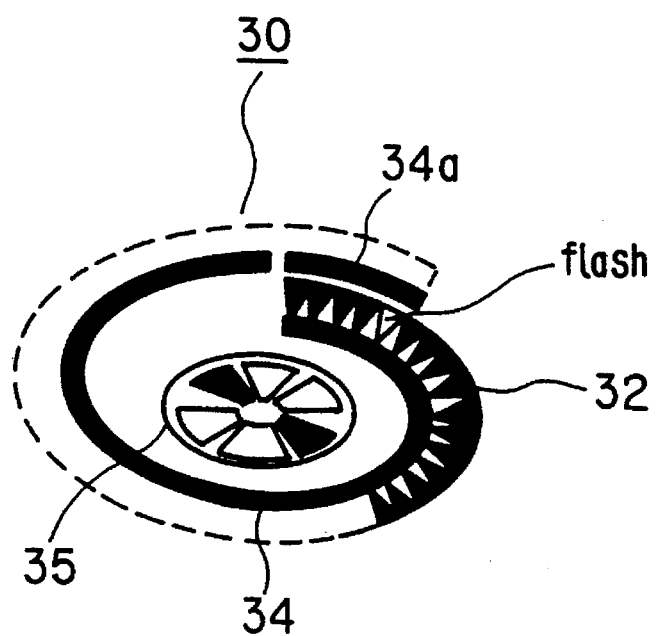

Also, as shown in FIGS. 16(a) and 16(b), a rotary display section 35 for indicating the rotary state of the disc may be disposed in the center of the spiral position pointer. In this example, the display of the rotary section 35 is changed in accordance with the operation of reproduction, recording, pause, fast forward/rewind or the like so that the user can readily grasp in which operating state the apparatus is by a visible image. Moreover, the kind of the disc loaded into the apparatus, that is, any one of the magneto-optical disc, the pre-recorded disc or the hybrid disc can be indicated by changing the shape of the rotary display section 35, and so on.

The various display forms of the position pointers 30 in this embodiment are not limited to the configurations shown in the respective figures, but can be modified if the recorded data capacity and the current position can be recognized.

Further, in this embodiment, the recording and/or reproducing apparatus was described as one example. However, the display form of the present invention can be applied to a recording only apparatus and a reproduction only apparatus in accordance with their functions. Moreover, the present invention is not limited to the recording and/or reproducing apparatus using a disc-shaped recording medium, but can be applied to apparatus having other kinds of recording medium.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A recording and reproducing apparatus for a recording medium on which management data for controlling the recording and the reproducing of data recorded in a data recording area has been recorded, said apparatus comprising:

head means for recording data on the recording medium or reading out recorded data from the recording medium;

arithmetic operating means for arithmetically computing the recording or reproducing position of the head means relative to data recorded on the data recording area of the recording medium by using the management data read out from the recording medium by said head means;

display means for displaying the recording or reproducing position of the head means and the amount of data recorded in the data recording area relative to the recording capacity of the whole of the data recording area; and display control means for causing said display means to display the amount of data recorded in the data recording area relative to the recording capacity of the whole of the data recording area using the management data read out from said head means and display an indication of the recording or reproducing position of the head means using the data representative of said position obtained by the arithmetic computation from said arithmetic operating means.

2. A recording and reproducing apparatus for a recording medium according to claim 1, wherein said display means comprises a plurality of first display segments and a second display segment representative of a position at which the recording medium is presently scanned by said head means, said second display segment being different in form from said first display segments, and said display control means causes said display means to display the entire recording capacity of the data recording area of the recording medium by a series of said plurality of first display segments.

3. A recording and reproducing apparatus for a recording medium according to claim 2, wherein said arithmetic operating means produces data representative of the quantity of data which has already been recorded on the recording medium using the management data read out from said head means, and said display control means causes said display means to display the data representative of the quantity of data, which has already been recorded, supplied from said arithmetic operating means by a series of said plurality of first display segments.

4. A recording and reproducing apparatus for a recording medium on which management data for controlling the recording or reproducing of data recorded in a data recording area has been recorded, the apparatus comprising:

head means for recording data on the recording medium or reading out recorded data from the recording medium;

arithmetic operating means for arithmetically computing the recording or reproducing position of data recorded on the data recording area of the recording medium by using the management data read out from the recording medium by the head means;

display means: and.

display control means for causing the display means to display an indication of the whole recording capacity of the recording area of the recording medium on the basis of the management data read out from the head means and for causing the display means to conduct a position display on the basis of data representative of the position obtained by the arithmetic computation from the arithmetic operating means; and wherein said display control means produces display control data k1 for displaying data representative of the quantity of data which has already been recorded on the recording medium by using said plurality of first display segments of said display means by an equation of $$k1=(l/m) \times n,$$

wherein n is the number of said first display segments of said display means, m is the entire data recording capacity of the recording medium, and l is the quantity of data which has already being recorded in the data recording area of the recording medium.

5. A recording and reproducing apparatus for a recording medium on which management data for controlling the recording or reproducing of data recorded in a data recording area has been recorded the apparatus comprising:

head means for recording data on the recording medium or reading out recorded data from the recording medium;

arithmetic operating means for arithmetically computing the recording or reproducing position of data recorded on the data recording area of the recording medium by using the management data read out from the recording medium by the head means;

display means; and display control means for causing the display means to display an indication of the whole recording capacity of the recording area of the recording medium on the basis of the management data read out from the head means and for causing the display means to conduct a position display on the basis of data representative of the position obtained by the arithmetic computation from the arithmetic operating means; and wherein said display control means produces display control data k2 for displaying data representative of a position at which the recording or reproducing operation has been stopped by using said plurality of first display segments of said display means by an equation of $$k2=(j/m) \times n,$$

wherein n is the number of said first display segments of said display means, m is the entire data recording capacity of the recording medium, and j is the quantity of data of from a head position of the data recording area of the recording medium to a position at which said head means stops the recording or reproducing operation.

6. A recording and reproducing apparatus for a recording medium on which management data for controlling the recording or reproducing of data recorded in a data recording area has been recorded, the apparatus comprising:

head means for recording data on the recording medium or reading out recorded data from the recording medium;

arithmetic operating means for arithmetically computing the recording or reproducing position of data recorded on the data recording area of the recording medium by using the management data read out from the recording medium by the head means;

display means; and display control means for causing the display means to display an indication of the whole recording capacity of the recording area of the recording medium on the basis of the management data read out from the head means and for causing the display means to conduct a position display on the basis of data representative of the position obtained by the arithmetic computation from the arithmetic operating means; and wherein said display control means produces display control data k1 for displaying data representative of the quantity of data which has already been recorded on the recording medium by using said plurality of first display segments of said display means by an equation of $$k1=(l/m)\times n, \text{ and}$$

display control data k2 for displaying data representative of a position at which the recording or reproducing operation has been stopped by using said plurality of first display segments of said display means by an equation of $$k2=(j/m)\times n, \text{ and}$$

wherein n is the number of said first display segments of said display means, m is the capacity of a data unrecorded area of the recording medium, l is the quantity of data which has already being recorded in the data recording area of the recording medium, and j is the quantity of data of from a head position of the data recording area of the recording medium to a position at which said head means stops the recording or reproducing operation.

7. A recording and reproducing apparatus for a recording medium according to claim 1, wherein said apparatus further comprises memory means for storing information relating to a position of said head means on the recording medium when the recording or reproducing operation is stopped, wherein said arithmetic operating means produces information relating to said position using information relating to the position of said head means on the recording medium from said memory means.

8. A recording and reproducing apparatus for a recording medium on which management data for controlling the recording or reproducing of data in a data recording area has been recorded, said apparatus comprising:

head means for conducting recording of data on the recording medium or reading out of recorded data from the recording medium;

recording and reproduction control means for discretely recording data on the recording medium by said head means, and for reading out data discretely recorded on the recording medium as continuous data on the basis of the management data;

first arithmetic operating means for arithmetically computing the reproducing position of data recorded on the data recording area of the recording medium by using the management data read out from the recording medium by said head means;

display means; and display control means for causing said display means to display an indication of the whole recording capacity of the recording area of the recording medium on the basis of the management data read out from said head means and for causing said display means to conduct a position display on the basis of data representative of said position obtained by the arithmetic computation from said first arithmetic operating means; and wherein said display control means produces display control data k1 for displaying data representative of the quantity of data which has already been recorded on the recording medium by using said plurality of first display segments of said display means by an equation of $$k1=(l/m)\times n,$$

wherein n is the number of said first display segments of said display means, m is the entire data recording capacity of the recording medium, and l is the quantity of data which has already being recorded in the data recording area of the recording medium.

9. A recording and reproducing apparatus for a recording medium according to claim 8, wherein said display means comprises a plurality of first display segments and a second display segment representative of a position at which the recording medium is presently scanned by said head means, said second display segment being different in form from said first display segments, and said display control means causes said display means to display the entire recording capacity of the data recording area of the recording medium by a series of said plurality of first display segments.

10. A recording and reproducing apparatus for a recording medium on which management data for controlling the recording or reproducing of data in a data recording area has been recorded, said apparatus comprising:

head means tier conducting recording of data on the recording medium or reading out of recorded data from the recording medium;

recording and reproduction control means for discretely recording data on the recording medium by said head means, and for reading out data discretely recorded on the recording medium as continuous data on the basis of the management data;

first arithmetic operating means for arithmetically computing the reproducing position of data recorded on the data recording area of the recording medium by using the management data read out from the recording medium by said head means;

display means; and display control means for causing said display means to display an indication of the whole recording capacity of the recording area of the recording medium on the basis of the management data read out from said head means and for causing said display means to conduct a position display on the basis of data representative of said position obtained by the arithmetic computation from said first arithmetic operating means;

wherein said display control means produces display control data k2 for displaying data representative of a position at which the recording or reproducing operation has been stopped by using said plurality of first display segments of said display means by an equation of $$k2 = (j/m) \times n, \text{ and}$$

wherein n is the number of said first display segments of said display means, m is the entire data recording capacity of the recording medium, and j is the quantity of data of from a head position of the data recording area of the recording medium to a position at which said head means stops the recording or reproducing operation.

11. A recording and reproducing apparatus for a recording medium according to claim 10, wherein said apparatus further comprises memory means for storing address information relating to a position of said head means on the recording medium when the recording or reproducing operation is stopped, wherein said first arithmetic operating means produces information relating to said position using address information relating to the position of said head means on the recording medium from said memory means.

12. A recording and reproducing apparatus for a recording medium on which management data for controlling the recording or reproducing of data in a data recording area has been recorded, said apparatus comprising:

head means for conducting recording of data on the recording medium or reading out of recorded data from the recording medium;

recording and reproduction control means for discretely recording data on the recording medium by said head means, and for reading out data discretely recorded on the recording medium as continuous data on the basis of the management data;

first arithmetic operating means for arithmetically computing the reproducing position of data recorded on the data recording area of the recording medium by using the management data read out from the recording medium by said head means;

display means; and display control means for causing said display means to display an indication of the whole recording capacity of the recording area of the recording medium on the basis of the management data read out from said head means and for causing said display means to conduct a position display on the basis of data representative of said position obtained by the arithmetic computation from said first arithmetic operating means; and wherein said display control means produces display control data k1 for displaying data representative of the quantity of data which has already been recorded on the recording medium by using said plurality of first display segments of said display means by an equation of $$k1 = (l/m) \times n, \text{ and}$$

display control data k2 for displaying data representative of a position at which the recording or reproducing operation has been stopped by using said plurality of first display segments of said display means by an equation of $$k2 = (j/m) \times n, \text{ and}$$

wherein n is the number of said first display segments of said display means, m is the capacity of a data unrecorded area of the recording medium, l is the quantity of data which has already being recorded in the data recording area of the recording medium, and j is the quantity of data of from a head position of the data recording area of the recording medium to a position at which said head means stops the recording or reproducing operation.

* * * * *